United States Patent [19]
Gadsby et al.

[11] Patent Number: 5,144,513
[45] Date of Patent: Sep. 1, 1992

[54] METHOD AND APPARATUS FOR CLEANING MAGNETIC TAPE HAVING AIR BEARINGS AND VACUUM-ASSISTED CLEANING

[75] Inventors: Larry R. Gadsby, Norristown, Pa.; Larry J. Pittman, Wheatridge; Philip J. Chermak, Lafayette, both of Colo.

[73] Assignee: Data Pure Corporation, Longmont, Colo.

[21] Appl. No.: 369,595

[22] Filed: Jun. 21, 1989

[51] Int. Cl.⁵ .................. G11B 23/50; G11B 15/67
[52] U.S. Cl. .................. 360/137; 15/DIG. 13; 242/195
[58] Field of Search .......... 360/137, 95, 93, 90, 360/128; 15/DIG. 12, DIG. 13; 242/195

[56] References Cited

U.S. PATENT DOCUMENTS

| | | | |
|---|---|---|---|
| 4,266,255 | 5/1981 | Camras | 360/90 |
| 4,477,851 | 10/1984 | Dalziel et al. | 360/95 |
| 4,620,256 | 10/1986 | Rubey | 15/DIG. 13 |
| 4,635,147 | 1/1987 | Durand et al. | 360/93 |
| 4,637,088 | 1/1987 | Badaracco et al. | 360/137 |
| 4,646,177 | 2/1987 | Sanford et al. | 360/95 |
| 4,704,645 | 11/1987 | Murphy et al. | 360/95 |
| 4,970,748 | 11/1990 | Rubey | 360/137 |

FOREIGN PATENT DOCUMENTS 0133680 8/1983 Japan .................. 15/DIG. 13

Primary Examiner—John H. Wolff
Assistant Examiner—Craig A. Renner
Attorney, Agent, or Firm—James R. Young

[57] ABSTRACT

A multifunction threading apparatus for threading a tape, such as a magnetic tape, from a tape cartridge along a tape path is disclosed. This multifunction threading apparatus includes a single cam connected by a guide arm to a threader arm which is capable of engaging and withdrawing the tape from the tape cartridge. Rotation of the cam causes rotation of the threader arm, which in turn withdraws the tape and threads it along the tape path and in contact with cleaning stations comprised of a two-sided vacuum assisted fabric wiping station and a vacuum assisted scraping station eventually delivering the tape to a take-up wheel. This tape path also includes air bearings with ceramic capped springs. A displacement arm slideably connected to the cam allows for temporary displacement of one side of the fabric wiping station to facilitate threading.

30 Claims, 14 Drawing Sheets

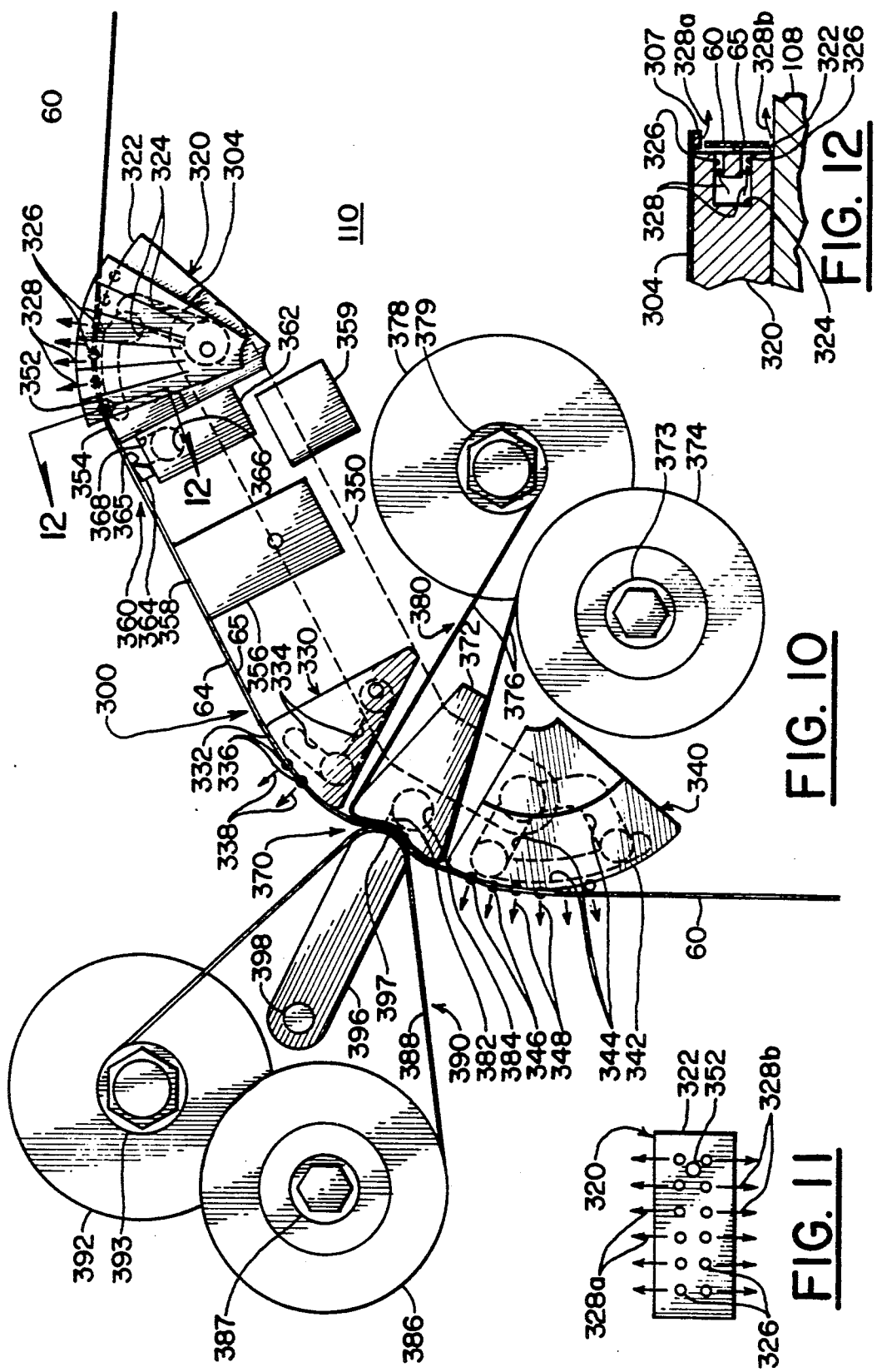

METHOD AND APPARATUS FOR CLEANING MAGNETIC TAPE HAVING AIR BEARINGS AND VACUUM-ASSISTED CLEANING

BACKGROUND OF THE INVENTION

1. Field of the Invention

The present invention relates broadly to magnetic tape drives and cleaners and more specifically to a method and apparatus for cleaning, re-tensioning, scanning, evaluating, recording, and reading magnetic tape cartridges.

2. Description of the Prior Art

Magnetic tape has long been the standard in data storage and retrieval. Today magnetic tapes have greater areal density (information storage capability per unit of tape area) than ever before. For example, the areal densities achieved with the IBM 3480 (trademark) half-inch cartridges are six times greater than those achieved with older half-inch open reel tapes. Even these areal densities are expected to further increase by a factor of at least 20 during the next decade. These increased densities have created a situation in which tapes and related reading and recording devices must be far more sensitive than ever before. Therefore, tape damage and airborne contamination that accumulates on tapes, which in the past would have gone unnoticed by reading and recording devices, now often results in loss of data, reduced reliability, and even down time due to equipment failure. Accordingly, these increased tape densities have created a greater need for an effective tape maintenance program. For example, when airborne contamination deposits and builds up on the inside surface of a tape to the point that it causes a mere 10-microinch separation between the tape and a reading device head, some problems in data retrieval can result. such airborne contamination builds up to the point that it causes only a 20-microinch separation between the tape and a reading head it can be devastating to data retrieval. To put this sensitivity in perspective, a smoke layer on a magnetic tape typically causes a 200-microinch separation between tape and head.

Accordingly, there is an increased interest in devices for cleaning magnetic tapes. Similarly, there is interest in devices for scanning tapes to detect physical defects, such as edge damage or stretched tape, which can also interfere with data recording and retrieval. Current systems designed to address the cleaning needs typically include a burnishing blade and multiple tissue wiping stations for dislodging and removing contamination. While such devices provide some beneficial cleaning, they tend to be large, bulky machines with long, undulating, and tortuous tape paths. These long tape paths are often used to facilitate numerous cleaning stations as well as to dampen motor drive oscillations. However, they have also resulted in nonuniform tape tension profiles, which can render tapes more susceptible to damage, accumulation of contamination, and difficulty in data retrieval and recording, as well as reduced system productivity.

SUMMARY OF THE INVENTION

Accordingly, it is a general object of the present invention to provide an improved method and apparatus for cleaning magnetic tapes which is faster, more efficient, and more economical than currently available tape cleaning systems, which can translate into improved system productivity and stored data integrity.

An additional object of the present invention is to provide an improved method and apparatus for cleaning magnetic tapes that reduces cleaner-induced wear on the tapes, thereby reducing damage to the tapes and accumulation of contamination on the tapes from the cleaning device.

Another object of the present invention is to provide a more effective cleaning method and apparatus that produces a tape which is cleaner after a single cleaning than most previous devices produced with several cleanings, thus further reducing wear and potential damage to the tape from the cleaning process itself.

A specific object of this invention is to provide a tape cleaner that has a shorter, less tortuous tape path with more effective cleaning apparatus along that shorter path than has been available heretofore.

Another specific object of the present invention is to provide greater control over tape tension during playing out and rewinding of a magnetic tape from a cartridge to achieve a more uniform tape tension profile within the tape cartridge, which allows improved high speed reading, recording, and cleaning functions.

A still further object of this invention is to provide a smaller more compact device for cleaning magnetic tapes yielding greater convenience in unit positioning, ease of operation, and speed in tape maintenance.

Additional objects, advantages and novel features of the invention will be set forth in part in the description that follows, and in part will become apparent to those skilled in the art upon examination of the following description or may be learned by the practice of the invention. The objects and the advantages of the invention may be realized and attained by means of the instrumentalities and in combinations particularly pointed out in the appended claims.

To achieve the foregoing and other objects in accordance with the purpose of the present invention, as embodied and broadly described herein, the apparatus for cleaning magnetic tapes of this invention may include a tape path defined by two cleaning stations comprised of a single two-sided fabric wiping station and a ceramic knife scraping station. Both of these cleaning stations are vacuum assisted. This tape path also includes a plurality of air bearings with ceramic capped air springs to create a virtually frictionless path for a tape.

A threading apparatus for threading a tape along this tape path includes a threader cam containing several guide slots, a threader arm, and a displacement arm. The threading apparatus is located adjacent and in association with said tape path. The threader arm is connected to the threader cam by means of a guide arm, which has its distal end slideably located within one of the guide slots located in the threader cam and which has a proximal end connected to the axle of the threader arm. This arrangement allows rotation of the threader arm as the threader cam rotates. This threader arm is positioned and constructed such that it can engage a tape puck, such as, for example, from a typical IBM (trademark) magnetic tape cartridge and subsequently by its rotation thread the magnetic tape along the tape path and in alignment with its cleaning stations and air bearings. A guide peg located at the distal end of the displacement arm is slideably positioned within another of the guide slots of the threader cam. The proximal end of the displacement arm is connected to an extension arm on one side of the two-sided fabric wiping station in such a manner that the fabric extension arm may be temporarily displaced to allow threading of the tape past and through said fabric wiping station. Further, this displacement arm is spring biased and of a sufficient length that its displacement only occurs for a few critical degrees in the rotation of the threader cam. This arrangement of the displacement arm allows the fabric to return to the fabric wiping station when the threader arm has delivered the tape beyond the fabric wiping station.

The apparatus of this invention further includes a tape take-up wheel defining the end of the tape path and positioned such that the rotating threader arm delivers the tape puck to its center. A tape take-up drive associated with the take-up wheel works in conjunction with a magnetic tape supply drive to propel the tape along the tape path.

An optical encoder, physically coupled to the take-up wheel, allows a microprocessor to monitor and thereby control the linear velocity of the tape along the tape path.

The magnetic tape supply drive is provided to engage and impart rotary motion to a central annular drum, such as those built into typical IBM (trademark) magnetic tape cartridges. A tape cartridge receiving unit is provided to receive the tape cartridge and facilitate positioning the cartridge adjacent and in engagable contact with the tape supply drive.

The method of the present invention may include cleaning a magnetic tape by running the tape along a tape path defined by cleaning stations, scraping the tape at one of those stations and wiping it at another station and, preferably, applying a vacuum adjacent the scraping and wiping devices. An additional step includes positioning at the fabric wiping station a single two-sided fabric wiping apparatus comprised of an outside fabric wiping apparatus and an inside fabric wiping apparatus. This two-sided wiping apparatus is arranged such that as the tape is run along the tape path it is simultaneously wiped on both sides. Additionally, the method may include the steps of positioning a cartridge containing the tape adjacent the start of the tape path in such a manner that the tape can be withdrawn from a central annular drum within the cartridge and run through the tape path described above and winding the tape onto a take-up wheel which defines the end of the tape path. Further steps include initiating the cleaning steps by a threading step wherein a puck attached to the distal end of the tape is engaged and pulled through the tape path to the take-up wheel and releasably attached to the take-up wheel. An additional step may include moving one side of the two-sided wiping apparatus out of the way to allow the puck to pass during the threading step, then propelling the tape along the tape path by rotatably driving the take-up wheel, thus winding the tape around the take-up wheel, while applying a predetermined dynamic resisting angular force on the cartridge annular drum to tension the tape between the take-up and cartridge wheel. The process includes, blowing air on one side of the tape to provide an air bearing which permits virtually frictionless movement along the tape path. Air pressure is monitored at the air bearing adjacent the tape to determine the magnitude of tape tension within the tape path. The optical encoder, tachometer, is monitored to determine the linear velocity of the tape. Then, based on the linear velocity, adjustments are made in the angular velocity of the take-up wheel and the resistance force on the cartridge annular drum to maintain constant linear velocity of tape across the cleaning stations along the tape path and to provide a constant tension on the tape between the take-up wheel and the cartridge drum. Finally the threading step of the method of this invention may include the step of effecting a pulling of the puck through the tape path accomplished by a single camming action coordinating the pulling of the puck with the moving of one side of the fabric wiping station out of the way.

BRIEF DESCRIPTION OF THE DRAWINGS

The accompanying drawings, which are incorporated herein and form a part of the specification, illustrate preferred embodiments of the present invention, and together with the description, serve to explain the principles of the invention. In the drawings:

FIG. 10 is an enlarged top plan view of the contact points of the tape path of the tape path chassis, but with the tape path cover removed;

FIG. 11 is an elevation view of a bearing face of an air bearing along the tape path;

FIG. 12 is a cross-sectional view of an air bearing according to the present invention taken along line 12—12 of FIG. 10;

DETAILED DESCRIPTION OF THE PREFERRED EMBODIMENT

The preferred embodiment tape cleaner apparatus 10 of the present invention as shown in FIGS. 1 and 4-8 is configured to accept and clean half-inch magnetic tape cartridges, such as, for example, IBM (trademark) tape cartridges used for high density storage of magnetic computer data. The same principles and features of this invention as described herein can also be applied to the cleaning, general care, and maintenance of other types of magnetic tape media, such as audio-visual tapes, audio tapes, and other brands and forms of data storage tapes.

Figure 1:
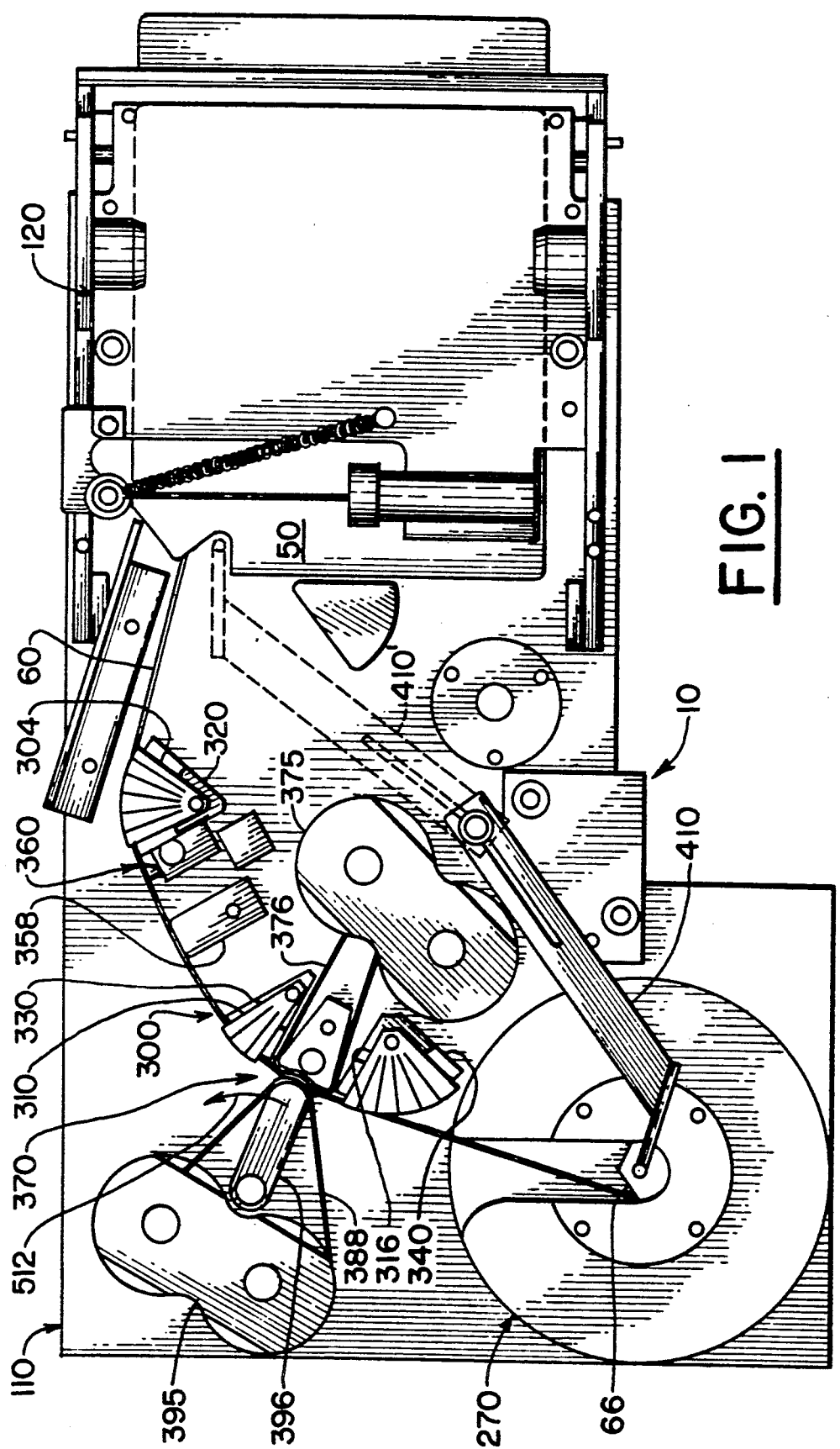
FIG. 1 is a plan view of the tape cleaner apparatus of the present invention showing the principal components.

In general, the preferred embodiment tape cleaner 10, as shown in FIG. 1, may include a tape path 300 located on a tape path chassis board 110 for running a tape 60 across and in cleaning contact with a ceramic knife scraping station 360 and a single, two-sided fabric wiping station 370. Fabric wiping station 370 includes two fabric wiping elements 375, 395. Inside fabric wiping apparatus 375 places a fabric 376 in cleaning contact with the inside surface of tape 60, and an outside fabric wiping apparatus 395 places a fabric 388 in contact with the outside surface of tape 60.

One end of tape path 300 is defined by a tape cartridge 50, which is located within a receiving unit 120 and contains tape 60. The other end of tape path 300 is defined by a take-up wheel 270, which receives and wraps tape 60 around itself. Tape path 300 may additionally include air bearings 320, 330, 340 and a guide block 358. Air bearings 320, 330, and 340 blow air in a configuration to suspend tape 60 in the tape path 300, thereby providing a smooth, virtually frictionless path for tape 60. The frictionless nature of tape path 300 is further enhanced by ceramic capped air springs 304, 310, and 316 positioned atop air bearings 320, 330, and 340, respectively, as will be described further below.

Tape 60 is initially threaded along tape path 300 by the rotation of a threader arm 410. Arm 410 is shown in FIG. 1, having delivered tape 60 to wheel 270 by placing a puck 66, attached to the distal end of tape 60, at the center of wheel 270. Threader arm 410 begins the rotational threading operation with the engagement of puck 66 at cartridge 50, when arm 410 is in the position shown in FIG. 1 by phantom lines 410'. During the threading rotation of arm 410, an outside fabric extension arm 396 is caused to rotate in the direction of arrow 512 and out of the way of advancing arm 410. Following the uninterrupted passage of arm 410 past cleaning station 370, fabric extension arm 396 reverses rotation, returning fabric 388 to cleaning contact with tape 60 at station 370. Coordination of the rotation of threader arm 410 with the temporary removal of extension arm 396 is accomplished by a camming mechanism, to be described in greater detail below.

Figures 2, 3:
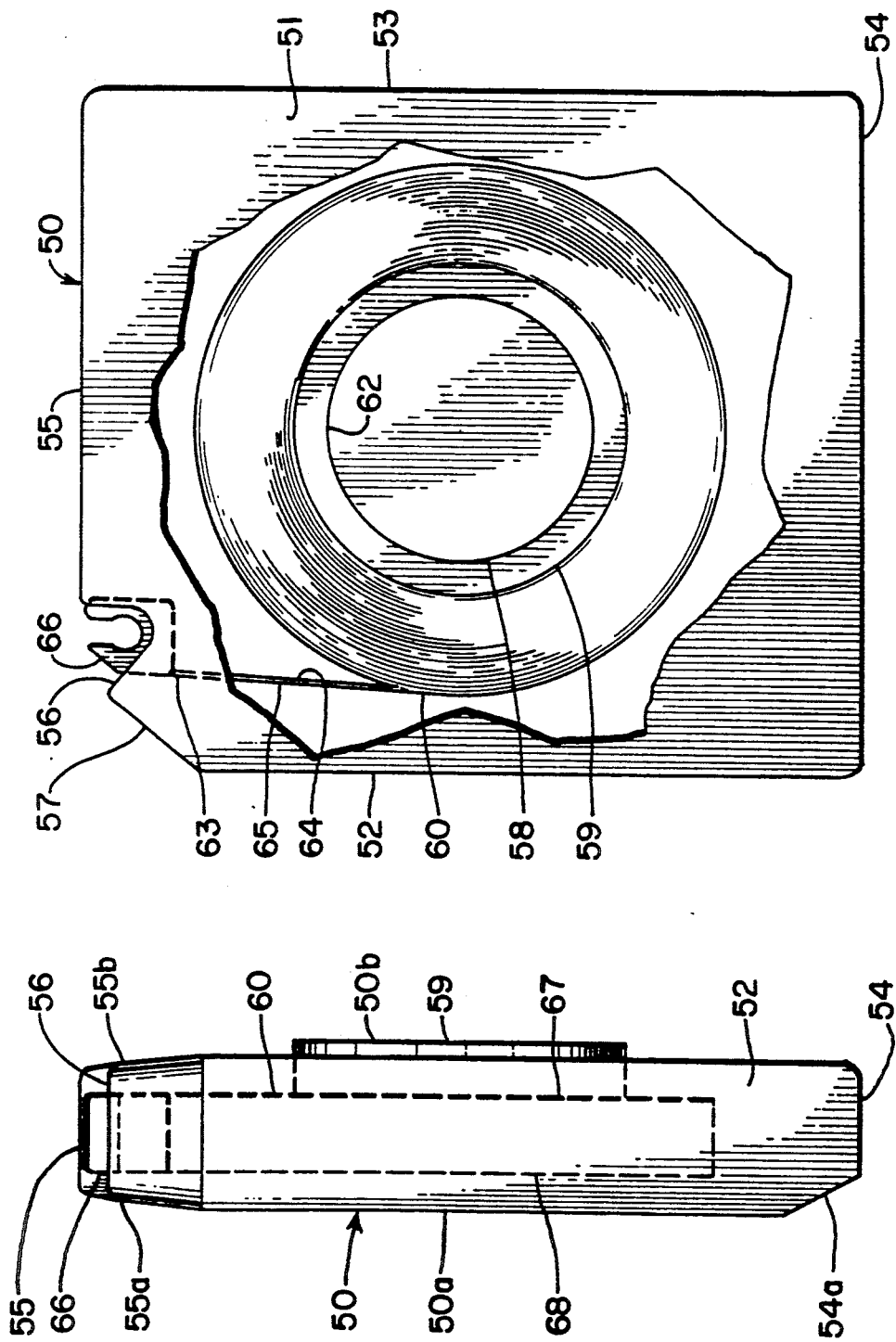
FIG. 2 is a side elevation view of a typical IBM (trademark) half-inch tape cartridge that can be serviced and maintained by the present invention.
FIG. 3 is a bottom plan view of the typical prior art half-inch tape cartridge of FIG. 2.

Before turning to the specifics of the present invention 10, tape cartridge 50, which is not a part of the invention, is described generally herein as background, since familiarity with cartridge 50 will facilitate understanding this invention. Cartridge 50, shown in FIGS. 2 and 3, may be any standard magnetic tape cartridge, such as, for example, a typical half-inch IBM (trademark) tape cartridge. Cartridge 50 includes a hard plastic case 51 which is shown as transparent in FIGS. 2 and 3 to better depict certain internal features. However, such cases are typically a dark smokey color which makes them only slightly translucent. With reference to FIG. 3, cartridge 50 contains side edges 52 and 53, a back edge 54, and a front edge 55. The only opening in cartridge 50 is port 56, which is located at one end of front edge 55 near side edge 52. Plastic case 51 encloses the entire remainder of cartridge 50. Near the center of cartridge 50 is a filled composition annular drum 58, about which a tape 60 is wrapped. A circular rise 59, concentric to drum 58, is located on the bottom of case 52.

Tape 60 has a proximal end 62 wrapped upon annular drum 58 and a distal end 63. A puck 66 located at port 56 is attached to the distal end 63 of tape 60 to capture the tape in threading and winding operations as will be described below. As shown in FIG. 2, tape 60 has a top edge 68 and a bottom edge 67. Inside surface 65 and outside surface 64 of tape 60 are best seen in FIG. 3.

With reference now primarily to FIG. 2, cartridge 50 has a top surface 50a and a bottom surface 50b. At the forward end of top surface 50a, approaching front surface 55, is a top taper 55a. Conversely, bottom taper 55b is at the forward end of bottom surface 50b as it approaches front surface 55. Slope 54a joins top surface 50a at back edge 54 at a slight incline to top surface 50a.

Figure 4:
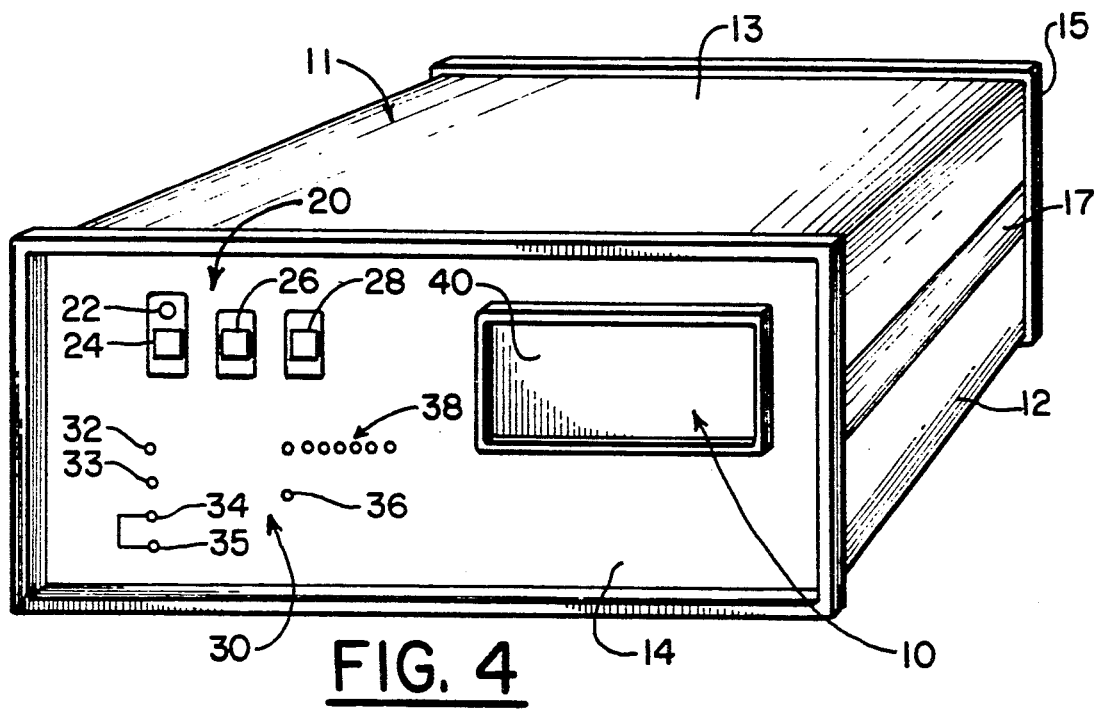
FIG. 4 is a perspective view of a cabinet that contains the magnetic tape cleaner apparatus of the present invention.
Figure 5:
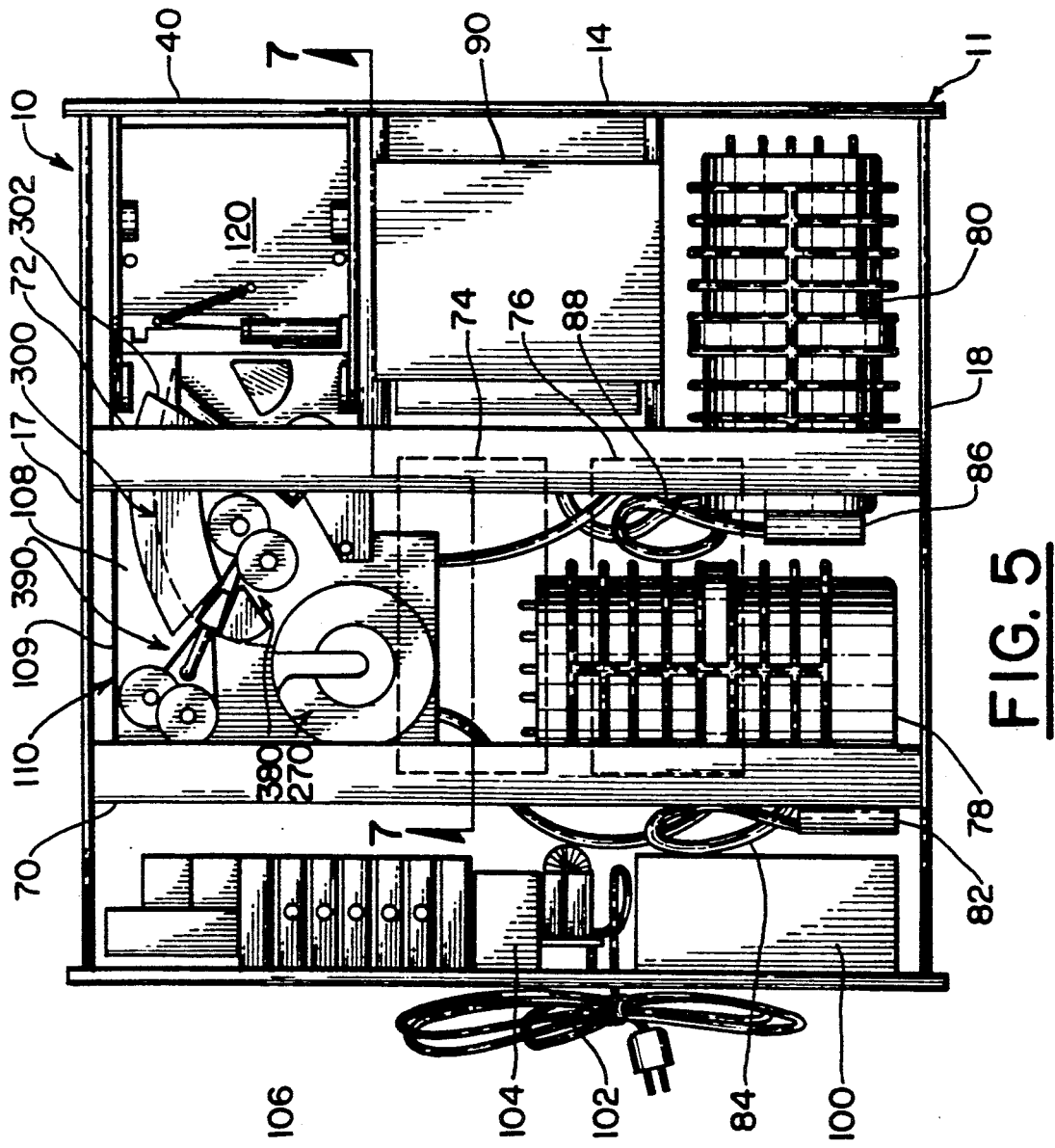
FIG. 5 is a top plan view of the cabinet in FIG. 4, with the top cover plate removed to show the positions and packaging of the components of the magnetic tape cleaner of the present invention.

The preferred embodiment tape cleaner 10 of the present invention is shown in FIGS. 4 and 5 packaged in a cabinet 11 comprised of a cover plate 13, a bottom plate 12, a face plate 14, and a back plate 15. Support arms 17 and 18 connect face plate 14 and back plate 15. Bottom plate 12 encloses the bottom portion of cabinet 11, extending from support arm 17 to support arm 18. Cover plate 13, similar to bottom plate 12, extends up from support arm 17, across the top of cabinet 11 and down to support arm 18. Located on the face plate 14 are operating controls 20, indicator lights 30, status lights 38, and a doorway 40. Operating controls 20 may include a start button 24, abort button 26, and a reset button 28. Doorway 40 is sized and shaped to allow insertion of tape cartridge 50. Greater detail will be provided below concerning operating controls 20, indicator lights 30, and status lights 38.

With reference now just to FIG. 5, cabinet 11 is shown from the top with cover plate 13 removed. The internal components of tape cleaner 10 include a tape path chassis 110, which is the primary tape cleaning and tensioning apparatus, microprosessor 90 for controlling the various machine and tape cleaning functions, vacuum pump 78 for providing cleaning vacuum, and positive pressure air pump 80 for pressurizing the air bearings, as will be described in more detail below. A tape cartridge receiving unit 120 for holding cartridge 50 during cleaning is located directly behind door 40 and on a top surface 108 of tape path chassis board 110. Dual air filters 74, 76 (shown in phantom lines in FIG. 5) are located on top of spacer arms 70, 72. Dual filters 74, 76 filter air supplied to vacuum pump 78 and air delivered from positive pressure air pump 80. Again, greater detail concerning the components of cabinet 11 are provided below.

Figure 6:
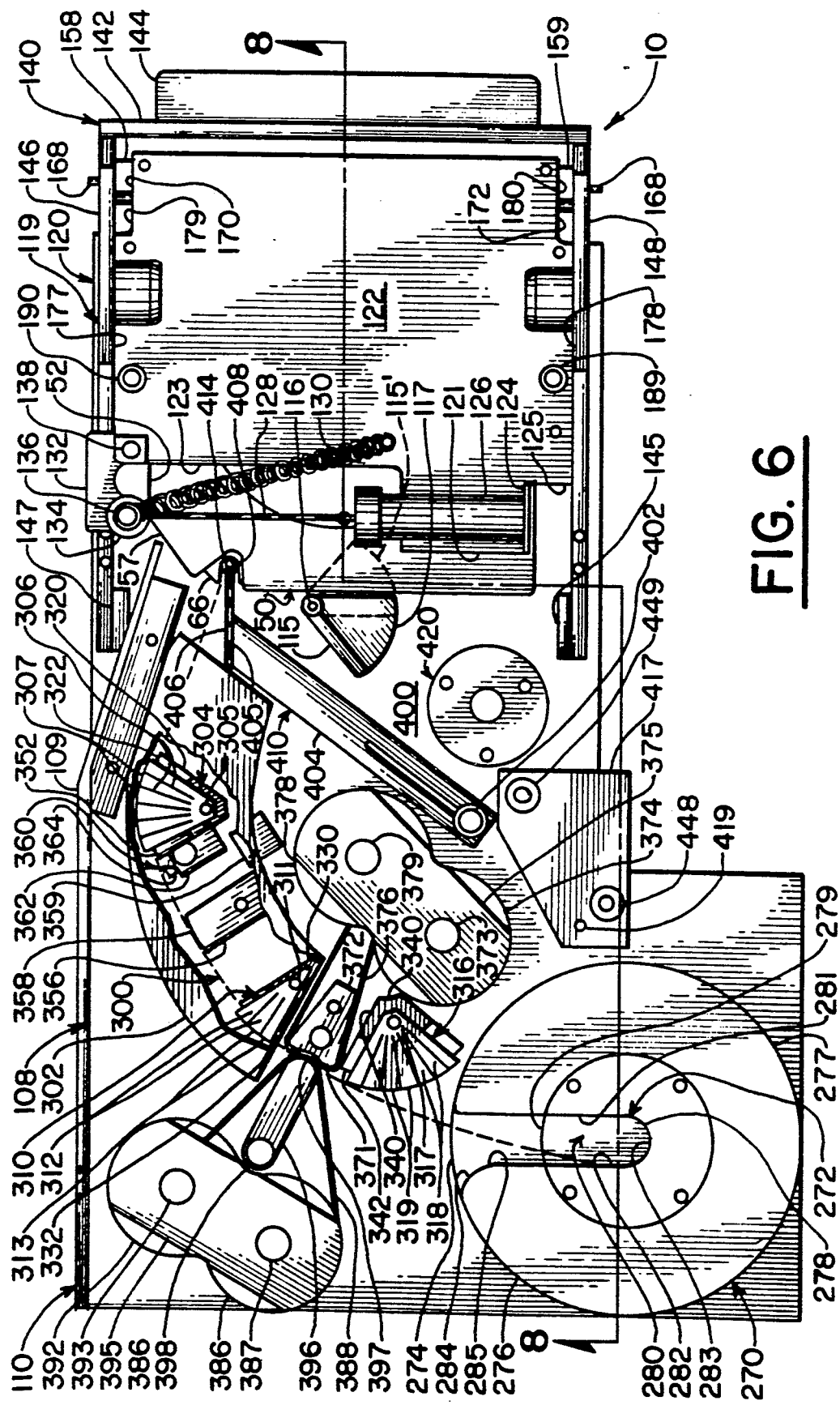
FIG. 6 is a top plan view of the tape path chassis.

With reference now to FIG. 6, the most significant feature of preferred embodiment 10 is tape path chassis 110. A tape path 300 is located between a tape take-up wheel 270 and a cartridge receiving unit 120 on the chassis 110. The cartridge receiving unit 120 is configured to receive and retain cartridge 50. With singular reference to FIG. 8, cartridge 50 is driven by a supply drive system 210 and take-up wheel 270 is driven by take-up drive system 250, as will be described in more detail below.

Tape path 300, returning to FIG. 6, includes three air bearings 320, 330 and 340 for guiding and retaining the tape 60 (not shown in FIG. 5) in the tape path 300. Air spring 304, which is positioned atop air bearing 320 is comprised of a solid base 305 and a plurality of palmately divided fingers 306 for retaining the top edge of a tape 60. A plurality of smooth ceramic ends 307 are attached under the distal ends of fingers 306. Air spring 304 is attached to air bearing 320 at its distal end or base 305, such that ceramic ends 307 of fingers 306 extend just beyond and over forward face 322. As will be described in more detail below, this air spring 304, while preferably having spring ends 307 made of smooth ceramic or other near frictionless surface material, and is designed for continuous rubbing contact with the tape. This air spring 304 guides and maintains the tape 60 in the tape path. Similar to spring 304, an air spring 310 comprising a proximal end or base 311, a plurality of palmately divided fingers 312, and smooth ceramic distal ends 313, is attached to air bearing 330. A third air spring 316 containing a base 317, a plurality of palmately divided fingers 318 and smooth ceramic ends 319, is attached to air bearing 340.

A portion of tape 60 is shown in FIG. 10 threaded along tape path 300 and adjacent faces 322, 332, and 342 of air bearings 320, 330, and 340 as well as adjacent face 358 of a path guide 356. In normal operations tape 60 is never in direct contact with these surfaces. Pressurized air 328, 338, and 348 exiting surfaces 322, 332, and 342, perpendicular to those surfaces suspends tape 60 on a cushion of air. Air bearings 320, 330, and 340, as best seen in FIG. 10 with the air springs 310, 316 removed, are supplied with lightly pressurized air from positive pressure air pump 80 (shown in FIG. 5) through positive pressure hose 88 (shown in FIG. 5) and through main air channel 350 in chassis 110 (shown in FIG. 10). A plurality of air ports 326 are distributed across the face 322 of air bearing 320, as shown in FIG. 11. Lightly pressurized air is communicated between main air channel 350 and air ports 326 by means of ducts 324 shown in phantom lines in FIG. 10 extending through the body of air bearing 320. These ducts 324 are internal cavities of air bearing 320, as shown in FIG. 10 and in the cross-section of FIG. 12.

Pressurized air exits ports 326 initially perpendicular to face 322 as shown by exhaust arrows 328 in FIG. 10. However, since tape 60 is impermeable to the exhausted air 328, the air flow which initially pushes tape 60 outwardly away from bearing face 322, is forced into a laminar flow parallel to the face 322 upwardly and downwardly between the tape 60 and the face 322, as shown by arrows 328a and 328b on FIG. 11 and in FIG. 12. Laminar flow 328b passes down between tape inside surface 65 and face 322 and is released as it passes the bottom edge 67 of tape 60. Laminar flow 328a passes up between tape inside surface 65 and face 322 to create a pressure envelope between tape 60 and face 322. Air spring 304 acts as a pressure confinement system, maintaining enough air between face 322 and tape 60 to suspend tape 60, but not enough to cause misalignment or damage to the tape 60.

The air bearings 330, 340 are similar in structure to the air bearing 320 described above, and air streams 338, 348 are projected therefrom to further guide tape 60 along the tape path.

A protective cover 302 covers most of tape path 300. In FIG. 6, cover 302 is shown transparent to reveal features below it; however, cover 302 may also be translucent or opaque. Another feature protecting tape path 300 is shield 109, which runs along cabinet support arm 17, as support arm 17 maybe ventilated.

The path 300 has several advantages over previous tape paths. Tape 60 travels on a cushion of air so its progress along tape path 300 is nearly frictionless, except for an almost negligible amount of air resistance and the contact points which are discussed below. Therefore, while it is recognized that in the real world absolute frictionless bearings are not possible, the actual friction is so negligible that for purposes of this description the tape path is referred to as essentially frictionless. Such a frictionless path allows for greater linear velocity control of tape 60 along path 300, while reducing wear and tear on tape 60. Further, this frictionless path reduces the generation of heat which might otherwise result in stretching and distorting of tape 60, thereby weakening it and resulting in data loss. Additional heat reduction to tape path 300 comes with singular reference to FIG. 5, from positive pressure air pump 80 which supplies air flow 328, 338, and 348, through filter 76. Filter 76 not only cleans the air but acts as a heat sink, thereby cooling air flow to air bearings 320, 330, and 340. Despite the frictionless cushion of air on which tape 60 runs, every surface along tape path 300 adjacent tape 60, including faces 322, 332, 342, 358, and ceramic ends 307, 313, 319, are made as smooth and frictionless as possible. This minimizes any wear on tape 60 should it accidently come into contact with any of these surfaces. Air flow 328 can be highly charged with negative ions from the positive pressure air pump. To reduce the static charge which might accumulate and damage tape 60, tape path 300 is fitted with an ionizer 359, which neutralizes the air.

It has been found that resonant vibration in a tape being pulled through a tape path can cause unnecessary detrimental wear and possible tearing or other damage to the tape, and certain velocities in relation to tape spans cause such resonance. To avoid such problems, the linear velocity should be maintained either just above or just below the velocity that causes such resonance in the tape. A shorter tape span results in higher resonance, thus allowing greater velocity. The components and configuration of tape path 300, according to this invention, provides a "tighter loop" than previous devices. This tighter loop of tape path 300 and its virtually frictionless path results in a much higher tape resonance. Therefore, tape 60 is capable of much higher linear velocity along path 300. Additionally, tape path 300 is a considerably shorter mean tape path than previous cleaners, which eliminates the weaving and snaking back and forth previously used to place a tape in contact with cleaners, scanners, reading devices, and other contact points.

As mentioned above, to reduce the amplitude of resonant motion and thereby reduce wear and tear on tape 60, the linear velocity should be maintained either just above or just below resonance. Accordingly, precision velocity control is required. This precision velocity control is accomplished in this invention by constant communication between and optical encoder 168 (as shown best in FIG. 7), physically coupled to take-up wheel 270, microprocessor 90, and by the constant adjustment by microprocessor 90 of drive systems 210 and tape take-up drive system 250. Tape tension control is effected by pressure transducer 352 which senses the pressure of air passing over it, the secondary result of which is the air pressure across transducer access port 354. Calculation of the tension component of tape 60, from the air pressure across transducer port 354 is based upon a spring model. For a spring, Newton's second law may be expressed as:

$$F = kx, \quad (1)$$

where F is the force on a spring (the tape), k is the spring constant, and x is the spring (the tape's lateral) displacement. Since pressure output of the pressure transducer is proportional to force, (pressure=force per unit area) and force is proportional to lateral displacement of the tape (spring), it is possible to measure the lateral displacement of tape 60 by pressure transducer 352. This displacement measurement is then translated to a component of tension representing the reel-to-reel strain on the tape.

Optical encoder 268 effects control of tape velocity via the measurement of longitudinal displacement of tape 60 The dimension of time is added by a system timing in microprocessor 90, provided by a 12 MHz crystal x1, which results in an oscillation period of 83.333 nanoseconds.

Constant linear velocity v of tape 60 along path 300 is maintained by continuous monitoring of optical encoder 268 and constant adjustment of the motor currents flowing to supply drive system 210 and take-up drive system 250. The linear velocity of tape 60 (actually the nonlinear displacement over time which is a function of velocity) and the motor currents are related as through motor torque as follows:

$$T = k_t I, \quad (2)$$

where T is the motor torque, $k_t$ is the motor torque constant and I is the motor current. However, motor torque T, is also related to the moment of inertia j and the angular acceleration a, as follows:

$$T = ja. \quad (3)$$

Accordingly, $$ja = k_t I. \quad (4)$$

Solving for the angular acceleration a, gives:

$$a = k_t I/j. \quad (5)$$

which is a first-order differential equation in angular velocity w, which can be controlled, and a second-order differential equation in angular displacement $\theta$.

The angular displacement of the motor is related to the nonlinear displacement of tape 60 by the following equation.

$$x = r\theta, \quad (6)$$

where r is the radius of the tape wrapped about either take-up wheel central drum 272 or the tape cartridge central drum 58. Radius r is proportional to the thickness of the magnetic tape 60, and the number of wraps about each drum, as counted by tachometer 268. Although the length of magnetic tape 60 is standard and must meet rather precise specifications, the thickness of tape 60 can vary considerably between individual tapes. An algorithim within microprocessor 90 calculates the thickness of a tape from the displacement of tape 60, as interpreted by optical encoder 268 and the initial rotations of take-up wheel 270. Therefore, the linear velocity v of tape 60 along path 300 is a function of the angular velocity w about both the take-up wheel 270 and cartridge drum 58 as controlled by motor current I flowing to drive motors 210, 250.

Microprocessor 90 calculates the necessary angular velocity, based on the required linear tape velocity and sends the appropriate current I to each of the drive motors 210 and 250. Typically, the required linear tape velocity v is a constant, however, it may be dynamic, such as during acceleration and deceleration. During operation the linear tape velocity v is continuously monitored by optical encoder 268 to ensure that the required linear tape velocity v is achieved. Once up to speed, control of tape 60, to a constant linear velocity v requires constant adjustment of the angular velocity w due to the constant change in the radius r (see equation 6) and thus necessitates a constantly varying motor current I and its related torque T. The frequency of these constant adjustments is typically in the range of about 500 Hz.

Motor current I is developed in both drive systems 210, 250 to produce the proper tension in tape 60 as it runs along tape path 300. Maintaining a constant linear velocity v results in not only a more efficient cleaning, optical scanning, magnetic scanning or data recording and reading functions, but also produces a much more even and properly tensional tape pack when tape 60 has been returned to cartridge 50.

With reference now back to FIGS. 6 and 10, tape path 300 has the possibility of having numerous contact points including, for example, evaluators such as optical or magnetical scanners, data recording and data reading devices, and/or cleaning devices. The primary cleaning devices in this invention, as shown in FIG. 10, include a scraping station 360 and a fabric wiping station 370. Scraping station 360 includes a base 362 with a ceramic scraper blade or knife 364 mounted therein. Scraping edge 365 of knife 364 is positioned against inside surface 65 of tape 60, along tape path 300, such that knife 364 scrapes macroscopic debris from inside surface 65. A vacuum access port 368 and its associated vacuum duct 366 in base 362 are connected to vacuum hose 84 and vacuum pump 78, and allow for the transmission of dislodged macroscopic debris away from tape 60.

Fabric wiping station 370 includes an inside wiping apparatus 380 and an outside wiping apparatus 390. A wiping guide block 372 is positioned with face 371 adjacent the inside surface 65 of tape 60 along tape path 300 at the fabric wiping station 370. An inside fabric supply spool 374 delivers an inside cotton cleaning fabric 376 around block 372 and over to an inside fabric take-up spool 378. Supply spool 374 is rotatably connected to axle 373; and, take-up spool 378 is rotatably connected to axle 379. Spools 374 and 378 are jointly enclosed within a case 375, which is shown in FIG. 6, but has been removed from FIG. 10, to better show those features below. Axle 379 is the driving axle for inside wiping apparatus 380, being connected by a belt 482 to a spool drive motor 476, (with singular reference to FIG. 13) below tape path board 110, as will be further described below. Axle 373 employs a standard spring biased clutch to create the necessary tension to inside fabric 376. Motor 476 allows for only one direction of rotation of axle 379, counter-clockwise as viewed from the top. When fabric 376 has been entirely transferred from supply spool 374 to take-up spool 378 it becomes necessary to change inside wiping apparatus 380. An operator is alerted to the necessity of such a change by the illumination of a "replace cleaning elements" light 36 on front panel 14, with singular reference to FIG. 4. Case 375 contains the supply spool 374, the take-up spool 378, and the wiping fabric 376 all as one unit and can be simply slipped over axle 373 and 379. The ease with which this operation can be performed means it typically takes less than 15 seconds to change the inside wiping apparatus 380.

Axle 379 rotates very slowly, so only about half an inch of fabric 376 is communicated across face 371 and in contact with inside surface 65 in cleaning a standard length of magnetic tape 60. Fabric 376 is assisted in the cleaning of tape 60 by a vacuum access port 382. Port 382 is connected by way of vacuum duct 384, located internal to block 372, to vacuum pump hose 84 and vacuum pump 78.

Scraping station 360 and wiping station 370 are vacuum-assisted for more efficient, effective, and thorough cleaning of tape 60. This vacuum assistance eliminates the need for additional or repeated cleaning stations. It is better to clean tape 60 once correctly and thoroughly than to repeat the cleaning process several times inadequately. The increased efficiency afforded by vacuum assistance, which has reduced the necessity of repeated cleaning stations, has further shortened this new tape path 300. The shorter mean tape path as discussed above has allowed greater control over tape velocity and tape tension, and has further created a more compact device.

The outside surface 64 of tape 60 is cleaned at wiping station 370 by the outside wiping apparatus 390. Outside wiping apparatus 390, similar to inside wiping apparatus 380 includes an outside supply spool 386 rotatably mounted on an axle 387, which initially contains outside wiping fabric 388. Fabric 388 is taken up by an outside fabric take-up spool 392 mounted on axle 393. Also similar to inside case 375, an outside case 395 (again shown in FIG. 6, but removed from FIG. 10) encloses both outside spools 386, 392, and fabric 388, and simply slips down over axles 387, 393 for easy exchange. Axle 387 employs a standard spring biased clutch to create the necessary tension to outside fabric 388. Take-up axle 393 is the driving axle of outside fabric wiping apparatus 390. Outside axle 393 is driven directly by motor 476, with singular reference to FIG. 13. The result of both wiping apparatus 380, 390 being driven by the same motor 476 is that both apparatus 380, 390 are operated at the same rate.

A rotable extension arm 396, with a distal face 397, places fabric 388 adjacent outside surface 64 of tape 60 along path 300 at fabric wiping station 370. Outside wiping apparatus 390, similar to inside wiping apparatus 380 has only about half an inch of fabric 388 communicated across face 397 and adjacent tape 60 during the cleaning of each tape. Extension arm 396 is free to rotate about an axle 398, however, axle 398 is spring biased by spring 438 (with singular reference to FIG. 13) to hold arm 396 in its normal, extended, position, which is the position shown in FIG. 10. More about spring 438, as well as the need and method of rotating extension arm 396, will be given below.

Figure 7:
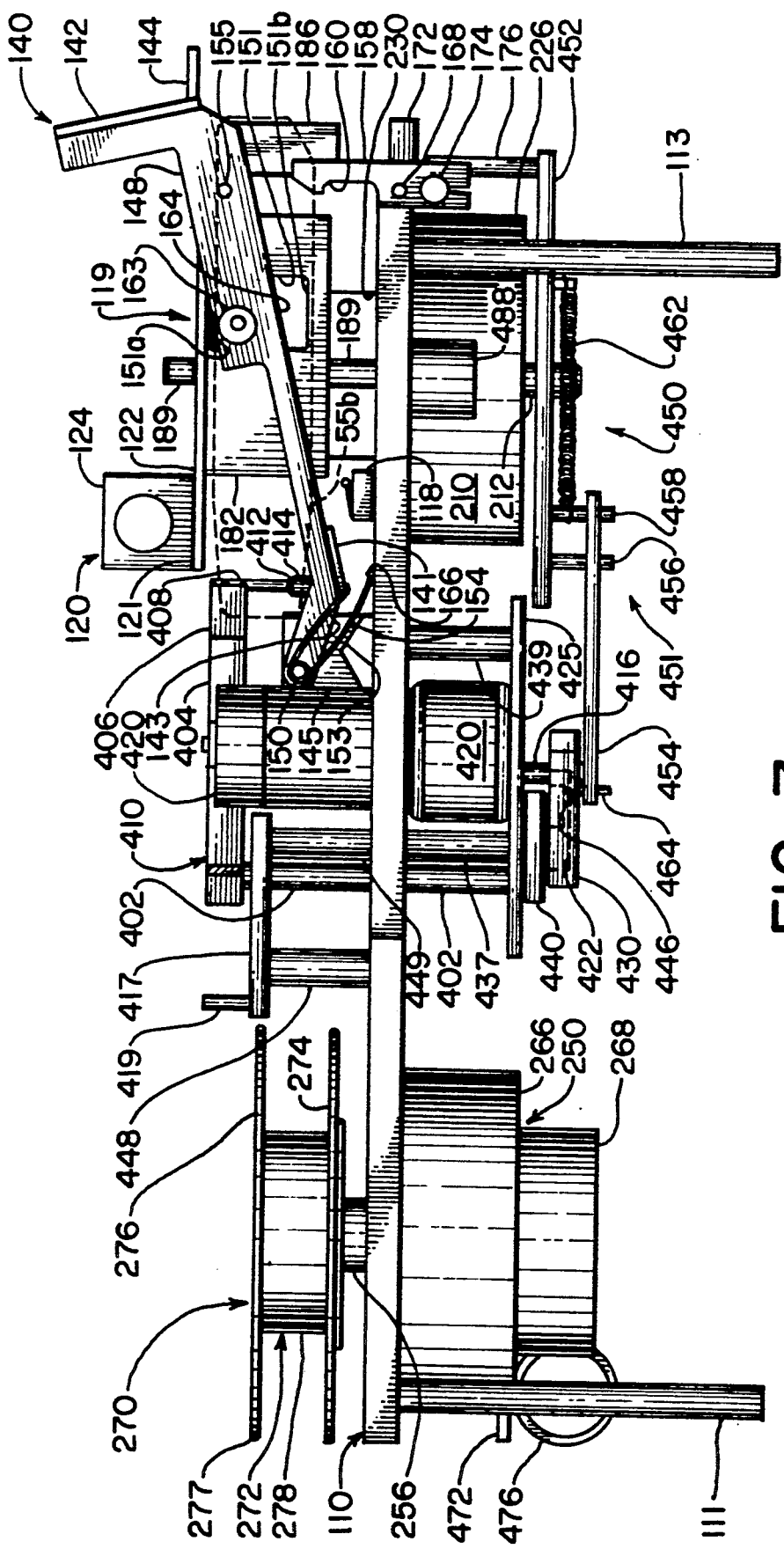
FIG. 7 is a left side elevation view of the tape path chassis viewed approximately from the position of line 7—7 in FIG. 5.
Figure 8:
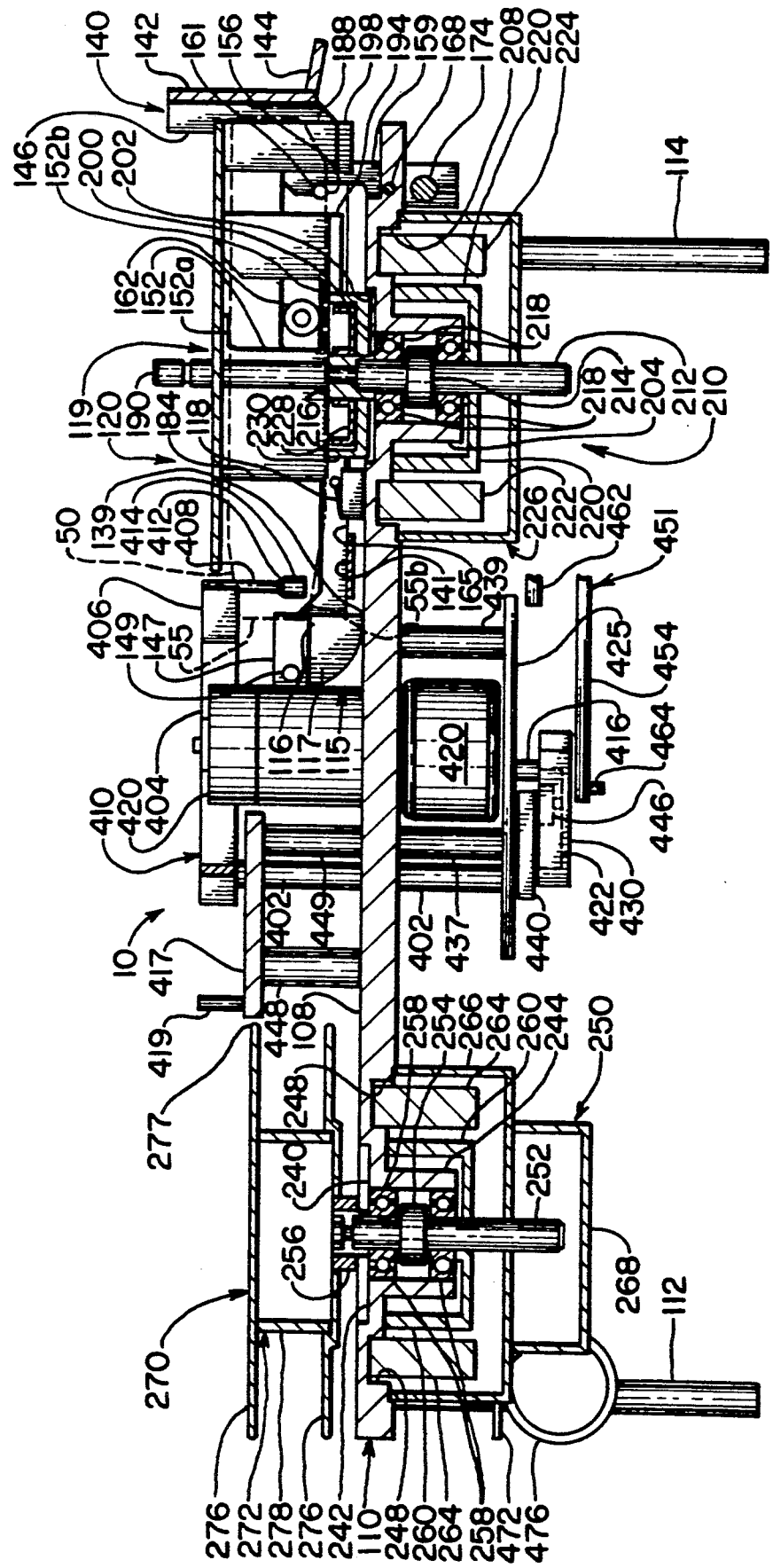
FIG. 8 is a cross-sectional view in elevation of the tape path chassis taken along section line 8—8 in FIG. 6.

With reference primarily to FIGS. 6, 7, and 8, a threading apparatus 400 includes a thread arm 410 and a threader drive motor 420. Threader arm 410 is comprised of a main body 404, which is free to rotate about an axle 402. Attached to distal end 405 of main body 404 is extension arm 406. An engagement rod 408 is secured to the end of extension arm 406. Engagement rod 408 extends down below extension arm 406 to taper 412 which extends out to enlarged end 414. As seen best in FIGS. 6 and 7, when cartridge 50 is lowered by pulling down door 140, the carriage 119 is also lowered causing tape puck 66 to be lowered around, and thereby engaged by enlarged end 414. A threader stop platform 417 with its stop bar 419 is provided to prevent overrotation of threader arm 410. Stop platform 417 is supported by legs 448 and 449. Threader arm 410 and threader drive motor 420 will be described in more detail below.

Figure 13:
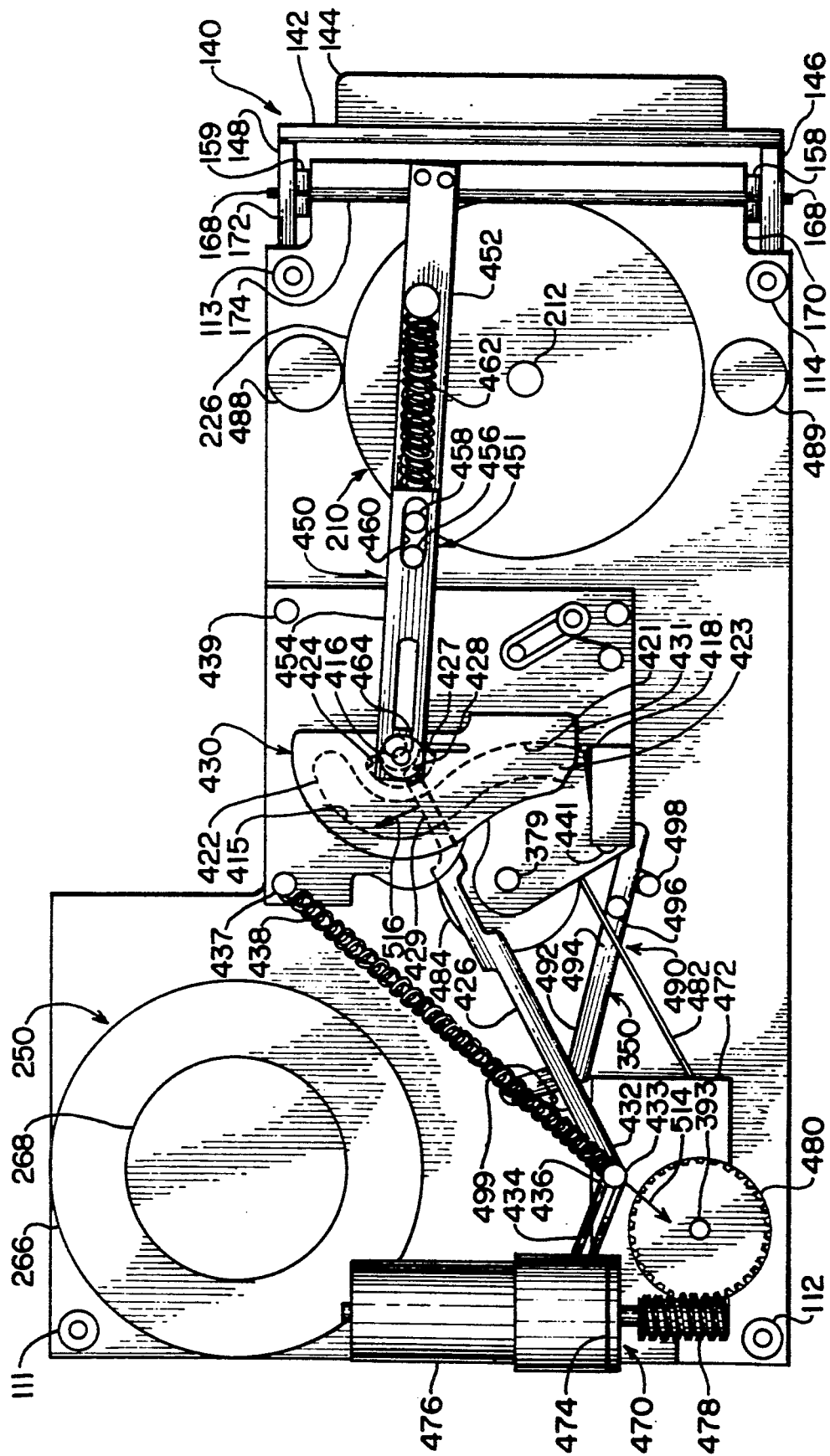
FIG. 13 is a bottom plan view of the tape path chassis.

The remaining elements of the threading apparatus 400 are positioned below tape path board 110, as best seen in FIG. 13. Threader cam 430 is rotably connected to threader drive axle 416. Threader arm 410 is located on a cam platform 425 and is depicted in FIG. 13 in its normal or home position. Platform 425 is suspended on legs 437, 439, 441, and 443. This home position is determined by nose 431 of cam 430 depressing a microswitch 418. This home position of cam 430 is more than just the position from which it begins its rotation, it is also a safety position in which cam 430 is held by microprocessor 90, until a cartridge 50 has been inserted, and tape 60 is ready to be played out, as will be further described below. Threader cam 430 contains two guide slots, a threader arm guide slot 422 and a fabric extension arm displacement guide slot 424, both of which are shown by dashed lines in FIG. 13. Threader arm guide slot 422 has an arced portion 415 which is concentric to axle 416. Arced portion 415 flares out to a flattened portion 421 which opens off of cam 430 at extreme end 423. Fabric extension arm guide slot 424 is located inside of guide slot 422, and is also arced concentric to axle 416, terminating at flattened edge 427. Also shown, partially in dashed lines is a displacement arm 426. A guide peg 428, also shown in dashed lines, is attached to proximal end 429 of displacement arm 426. Guide peg 428 is slidably mounted within displacement guide slot 424. Distal end 432 of displacement arm 426 is rotably connected at scissor connection 433 to a flexing arm 434 at its distal end 436. Also attached to scissor connector 433 is bias spring 438. Proximal end of flexing arm 434, not shown in the drawings, but located behind motor as seen in FIG. 13, is attached to fabric extension arm axle 398.

A cleaning fabric drive apparatus 470 is provided and attached primarily to platform 472 and normal surface 474. Fabric drive apparatus 470 includes spool worm drive motor 476, which drives a worm gear 478. Worm gear 478 drives wheel gear 480, which is connected to outside cleaning fabric take-up spool axle 393. A pulley is also connected to spool axle 393, but this pulley not shown in the drawings lies directly below wheel gear 480 and platform 472. This pulley attached to axle 393 drives fabric system coordination belt 482, which is wrapped around and drives inside spool pulley 484. Pulley 484 is connected to inside cleaning fabric take-up spool axle 379, which axle is secured in platform 425. With singular reference back to FIG. 10, belt 482 coordinates inside fabric wiping apparatus 380 with outside fabric wiping apparatus 390, moving both fabrics at the same rate.

Two pneumatic diaphrams 488, 489 are provided just below the cartridge receiving unit 120 and adjacent supply drive housing 226 on opposite sides. Pneumatic diaphrams 488, 489 assist in the smooth lowering of carriage 119. Pneumatic diaphrams 488, 489 also assist beveled cam 115 in breaking the magnetic bond, which tape supply drive system 210 holds on annular drum 58 within tape cartridge 50.

An air supply system 490 includes the main air channel 350, depicted in phantom lines in FIG. 10. Channel 350 is sealed by a gasket material 492 and plugged by cap 494. A positive air pressure supply port 496 is contained within cap 494 and allows easy attachment and clamping of positive pressure hose 88. Two vacuum access ports 498 and 499 are located below vacuum ducts 366 and 384 and adjacent air channel 350. Similar to port 496, vacuum ports 498 and 499 allow easy attachment and clamping of vacuum hose 84.

Referring to FIGS. 6 through 9 further explain the features of the tape path board 110, tape path board 110 is supported by four legs 111, 112, 113, and 114.

Figure 9:
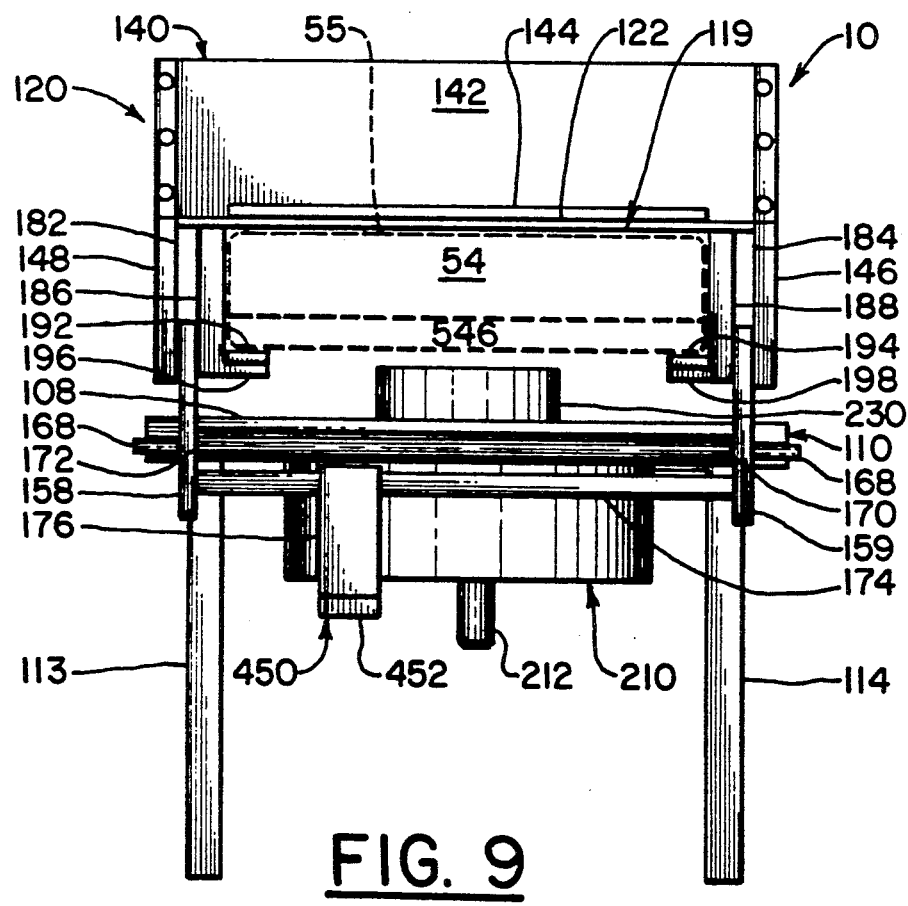
FIG. 9 is a front elevation view of the tape path chassis as it would appear if the front panel of the cabinet of FIGS. 4 and 5 was removed.

Cartridge receiving unit 120, located on tape board 110, is accessed through doorway 40 in the front panel 14 of cabinet 11, with singular reference to FIG. 4. A major component of cartridge receiving unit 120 is slideable cartridge carriage 119 for receiving and retaining the tape cartridge 50. Tape cartridge 50 is shown in phantom lines in FIGS. 7-9. The slidable carriage 119, as seen best in FIG. 9, is comprised of platform 122, forward carriage sides 186, 188, and lip guides 196, 198, which extend inwardly from sides 186 and 188, respectively. Additionally, carriage 119 has a pair of thickened rear carriage sides 182, 184 positioned behind sides 186, 188 with corresponding inwardly extending lip guides 192, 194. Lip guides 192 and 194 support tape cartridge 50 (shown in phantom lines in FIG. 9) when inserted within carriage 119. The vertical space between forward lip guides 196, 198 and top platform 122 is slightly larger than the thickness of a typical tape cartridge 50 and provides enough room for smooth initial insertion of cartridge 50 into carriage 119. The vertical space between the rear lip guides 192, 194 and top platform 122, however, is slightly less and is just sufficient for a snug fit when the tape cartridge 50 is inserted fully into the carriage 119. The bottom forward taper 55b of cartridge 50 allows for smooth transition between the above-described lip levels.

Platform 122 has an extended rear edge 121 and parallel rear edges 123, 125. Side edges 177, 178 of platform 120 are adjacent lateral rear edges 123, 125. Indented front sides 179, 180 are parallel to sides 177, 178 and are directly above indented front edges 170, 172 of board 110. Slideably located through platform 122 and thickened sides 182 and 184 are rods 189 and 190, which are shown in FIGS. 7 and 8, respectively, but which are hidden in FIG. 9. Slidable cartridge carriage 119 is free to slide up and down along rods 189, 190.

A door 140 is movably placed in doorway 40 and contains a door face 142 and a handle 144 which protrudes outwardly therefrom. Door face 142 is attached to the distal ends of door arms 146 and 148, the proximal ends of which are pivotally connected by pivot pins 149 and 150, respectively, to support members 145 and 147, also respectively. Door arm 148 has a bottom edge 164 and a slanted rear edge 143. Similarly, door arm 146 has a bottom edge 165 and a slanted rear edge 139. Door arms 146 and 148 are additionally connected by a cross member 141 which extends between the respective bottom edges 164, 165 of arms 146, 148. In its up position (open position) lock pins 155 and 156 butt against the bottom of platform 122. This open position is shown in FIG. 6. When door 140 is in its down position (closed position) door arm slanted surfaces 139, 143 butt against slanted door stops 153, 157, respectively, located on support members 145, 147, respectively. This closed and down position places door face 142 across opening 40. The closed position of door 140 is depicted in FIG. 8. A piano spring 154 attached around pivot pin 150 of door arm 148 puts seperating tension between the bottom edge of arm 148 immediately behind cross member 141 and connector 166 on tape path board surface 108. This separating tension from spring 154 biases door 140 in the up or open position.

The closing of door 140 is begun by an operator applying downward pressure on handle 144. The operator's downward pressure need not be excessive. In the final phase of closing door 140, the operator's downward pressure is aided by suction from pneumatic diaphrams 488, 489 (with singular reference to FIG. 13). Door 140 is held in the closed position by engagement of lock pins 155, 156 by notches 160, 161 on latches 158, 159. Door guide pegs 162, 163 are located about midway along the length of door arms 146, 148, respectively. Guide pegs 162, 163 are free to travel within slots 151, and 152 which are located in carriage sides 182 and 184 respectively. When door 140 is in the up or open position, guide pegs 162, 163 hold cartridge carriage 119 up by butting against the tops 151a and 152a of slots 151 and 152 respectively. As the operator pulls down on handle 144, thereby closing door 140, the operator is also moving door guide pegs 162, 163 downwardly through slots 151 and 152. Eventually pegs 163 and 164 engage bottoms 151b and 152b of slots 151 and 152 pulling down the entire cartridge carriage 119 along rods 189, 190. Spring 154 biases door 140 and thus cartridge carriage 119 in the up or open position. Spring 154 acts as a shock absorber, preventing damage to tape cartridge 50 during insertion and removal.

Latches 158, 159 are rotatably connected to latch axle 168, the ends of which extend laterally outward from indented and lowered front edges 170, 172 of tape path board chassis 110. Latches 158, 159 are connected by release rod 174. Latches 158 and 159 are normally held in the primarily vertical position, shown in FIG. 7, by a bias spring (not shown).

Release of door 140, so it is allowed to return to its normal up (open) position, is partially accomplished by door release mechanism 450. Release mechanism 450 includes release rod 174, described above, and a release member 176.

With incidental reference to FIGS. 7 and 8, but now with primary reference to FIG. 13, the remaining components of door release mechanism 450 include a releasing arm 451 comprised of a parallel release arm 452 and a cam release arm 454. Arm 452 and arm 454 are slidably connected by connecting bolts 456, 458, which are fixed to arm 452 through connecting slot 460 in arm 454. This slidable connection allows for an elongation and contraction of releasing arm 451 of a few millimeters, the purpose of which will be discussed below. Releasing arm 451 is held in a normally contracted state by spring 462. Release arm 451 is connected to cam 430, just off axis at peg 464, such that when cam 430 is rotated counterclockwise, as viewed in FIG. 13, releasing arm 451 is elongated and displaced, causing release member 176 to pull on release rod 174. Release member 176 pulling on release rod 174 rotates latches 158, 159 about axis pin 168 such that notches 160, 161 are moved forward. Rotation of latches 158, 159 release lock pins 155, 156 and allows spring 154 to restore door 140 to its normal up position.

As seen in FIG. 7, a bracket 124 extends upwardly perpendicular to platform 122 near its rear edge 121. Airpot 126 is attached to bracket 124. A swing arm 132 is located at the rear of platform 122 adjacent lateral edge 123. Swing arm 132 is free to rotate about pin 138. Elongated bumper 134 is secured to swing arm 132 by nut 136. Bumper 134 extends downwardly from swing arm 132 such that it is engaged by slanted surface 57 of tape cartridge 50 as tape cartridge 50 is inserted into receiving unit 120, thus causing bumper 134 to move out of the way of advancing cartridge 50, thereby rotating swing arm 132. Swing arm 132 is at its fullest rotation when cartridge 50 has been fully inserted and bumper 134 comes to rest on side edge 52. Extension arm 128 extends from airpot 126 and is secured by nut 136. Also secured to nut 136 is restoring spring 130 which biases rotation arm 132 forward such that bumper 134 normally rests against lateral edge 123 when not pushed out of the way.

A beveled cam 115 and a micro switch 118 are located on surface 108 of tape path board 110, directly behind the cartridge receiving unit 120. Micro switch 118 is activated by the forward bottom surface 55b of tape cartridge 50 when cartridge 50 has been fully inserted into receiving unit 120 and carriage 119 has been lowered, as shown in FIG. 8. Micro switch 118 acts as a safety switch, enabling the remaining tape path operations only when cartridge 50 has been inserted and is in its locked down ready position.

Tape cartridge 50, in its locked down ready position, is secured in place by the magnetic hold of an annular magnet 228 (seen only in FIG. 8) on a metallic annular disk 58, which is an integral part of tape cartridge 50. Annular shield 230, which surrounds and houses magnet 228, holds tape cartridge 50 a spaced distance above surface 108.

A beveled cam 115, is also positioned at the rear of cartridge receiving unit 120, as seen in FIGS. 6 and 8. Beveled cam 115 dislodges tape cartridge 50 from the magnet 228 when the tape cartridge 50 is to be removed from the cartridge receiving unit 120. The cam 115 is rotatably mounted on the top surface 108 of tape path board 110 and has an upwardly inclined camming surface 117 adapted to move under inclined surface 55b of tape cartridge 50 to wedge tape cartridge 50 upwardly. The beveled cam 115 can rotate counter clockwise about pivot axis 116 to move beveled surface 117 under tape cartridge 50 to the position shown by phantom lines 115' in FIG. 6. As cam 115 progresses through its rotation camming surface 117 lifts tape cartridge 50 upwardly and away from annular magnet 228, finally breaking the hold magnet 228 has on disk 58. Once this magnetic hold between magnet 228 and disk 58 is broken, door arm bias spring 154 begins the restoration of door 140 to its up or open position, thus raising carriage 119. Before door arms 146 and 148 are fully raised, and accordingly, before carriage 119 is fully raised, beveled cam 115, continuing in its rotation, begins to push against tape cartridge leading edge 55 with enough pressure to move tape cartridge 50 slightly toward doorway 40. This forward movement of tape cartridge 50 causes bumper 134 to move from tape cartridge side edge 52 to slanted surface 57, allowing spring 130 to act on swing arm 132 by pulling it through its rotation. This rotation of swing arm 132 about its pivotal mounting 138 toward edge 123 causes bumper 134 to bear on slanted surface 57 pushing cartridge 50 forward, out of receiving unit 120 and through doorway 40.

Airpot (tradename) 126 is provided to keep bumper 134 from propelling tape cartridge 50 too rapidly out of doorway 40. A pneumatic plunger (not shown) within Airpot 126 is connected to an extension rod 128, which is connected to the bumper 134. Therefore, Airpot 126, with its restricted capacity to exhaust air, slows the restoring action of spring 130 on bumper 134. Accordingly, tape cartridge 50 passes gently through doorway 40 coming to rest with its edge 54 extending a reasonable distance beyond doorway 40.

The threading operation is shown by sequential FIGS. 14 through 18 and with occasional reference to FIG. 13. Beginning with FIG. 14, the first of the sequential figures, tape cartridge 50 is shown inserted and locked down in receiving unit 120, the general position of which is indicated in FIGS. 14–18, but the actual components and mechanisms of which are not shown in these drawings because they are not necessary to an understanding of the threading features now being described. Likewise, to more clearly depict the working relationship between threading and cleaning components now being described, the tape path cover 302 and air springs 304, 310, and 316 from previous drawings are also not shown in FIGS. 14–18. Graphic features of FIGS. 14 through 18, that do not represented actual structure but rather aid in understanding this part of the invention include variable cut-away 500, zero reference arrow 502, progressive reference arrows 504, 506, 508, and 510; movement arrows 512, 514, and 516 and vibration arrows 520, 522, 524, and 526. These graphical features are found only on these drawings FIGS. 14 through 18 to which they specifically apply. The actual perimeter of variable cut-away 500 changes slightly through the successive drawings, but in each case reveals the threader cam 430, which is positioned below the tape path board 110, and the relationship of tape path board 110 to those elements of threading apparatus 400 above tape path board 110. Zero reference arrow 502, as the name implies, shows the starting location of threader arm 410 when cam 430 is in the home position. Each of the successive reference arrows 504, 506, 508, and 510 indicate an arc swing of threader arm 410 about its axis 402 of approximately 50°, 100°, 135°, and 165°, respectively. Movement arrows 512, 514, and 516 show the direction of rotation of fabric extension arm 396, as well as the movement of fabric displacement arm 426. Vibration arrows 520, 522, 524, and 526 are to reflect the vibration of take-up wheel 270.

Fabric displacement arm 426 is exposed by cut-away 500, which also exposes several other features of the structure that were hidden in previous views. A guide arm 440 is attached at its proximal end 442 to threader arm axle 402 just below board 110, platform 425, and displacement arm 426. A guide wheel 446, located at distal end 444 of guide arm 440, is slideable along the length of threader arm guide slot 422.

Figure 14:
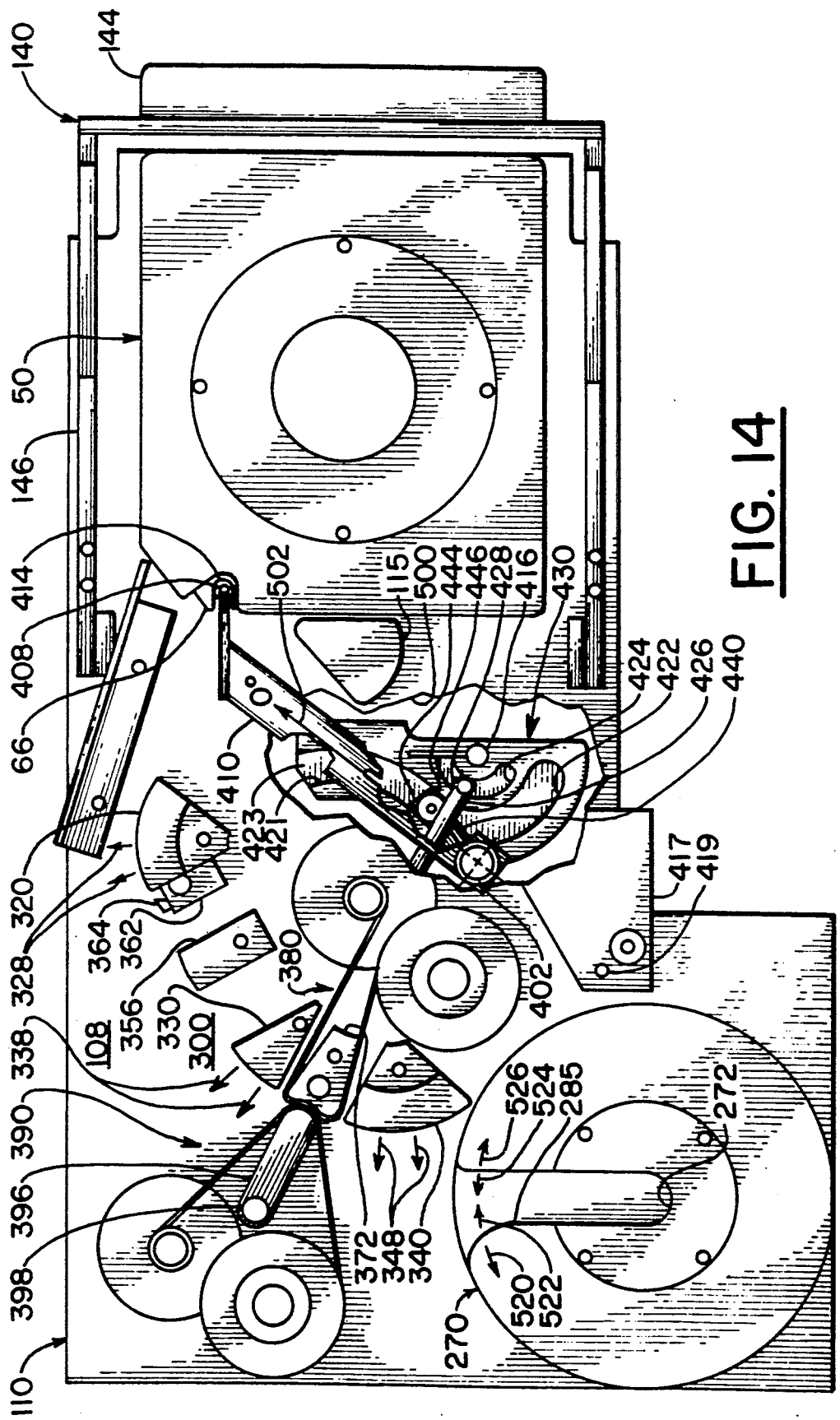
FIG. 14 is a top plan view of the tape path chassis, with a portion of the chassis frame cut away to reveal the threader cam on the bottom side of the tape path chassis and to show the relationship between the threader arm on top with the threader cam on the bottom when the threader arm is in the home position.

Threader cam 430 is the single most important element of threading apparatus 400, as well as being one of the significant elements of the present invention. Despite its deceptively simple appearance, it is quite sophisticated in its operation and engineering and is far reaching in its effect. Cam 430 is depicted in FIG. 14 in its waiting or home position. Likewise, threader arm 410 is shown in its normal or starting position, as indicated by zero degree reference arrow 502. Because tape cartridge 50 is in the lock down position, puck 66 is engaged by rod 408 and its enlarged end 414. As discussed above, moving cartridge 50 into its lock down position by closing door 140 not only engages puck 66 by rod 408, but also triggers microswitch 118 to send a message to microprocessor 90 that it is permissible to enable the threading operation.

The threading operation begins when start button 24 (seen in FIG. 4) is pressed to enable threader drive motor 420. Motor 420 is seen in FIGS. 6, 7, and 8, but not in sequential FIGS. 14 through 18. Also activated by pressing start button 24 is the flow of positive air pressure to tape path 300. Additionally, a slow deliberate rotation of take-up wheel 270 is activated by pressing start button 24 to zero tachometer 268. Once tachometer 268 has been zeroed, microprocessor 90 aligns take-up wheel 270 on an index mark and begins a slight vibration of take-up 270 as indicated by vibration arrows 520, 522, 524, and 526. This vibration facilitates delivery of tape 60 to take-up wheel 270 as will be discussed below.

Figure 15:
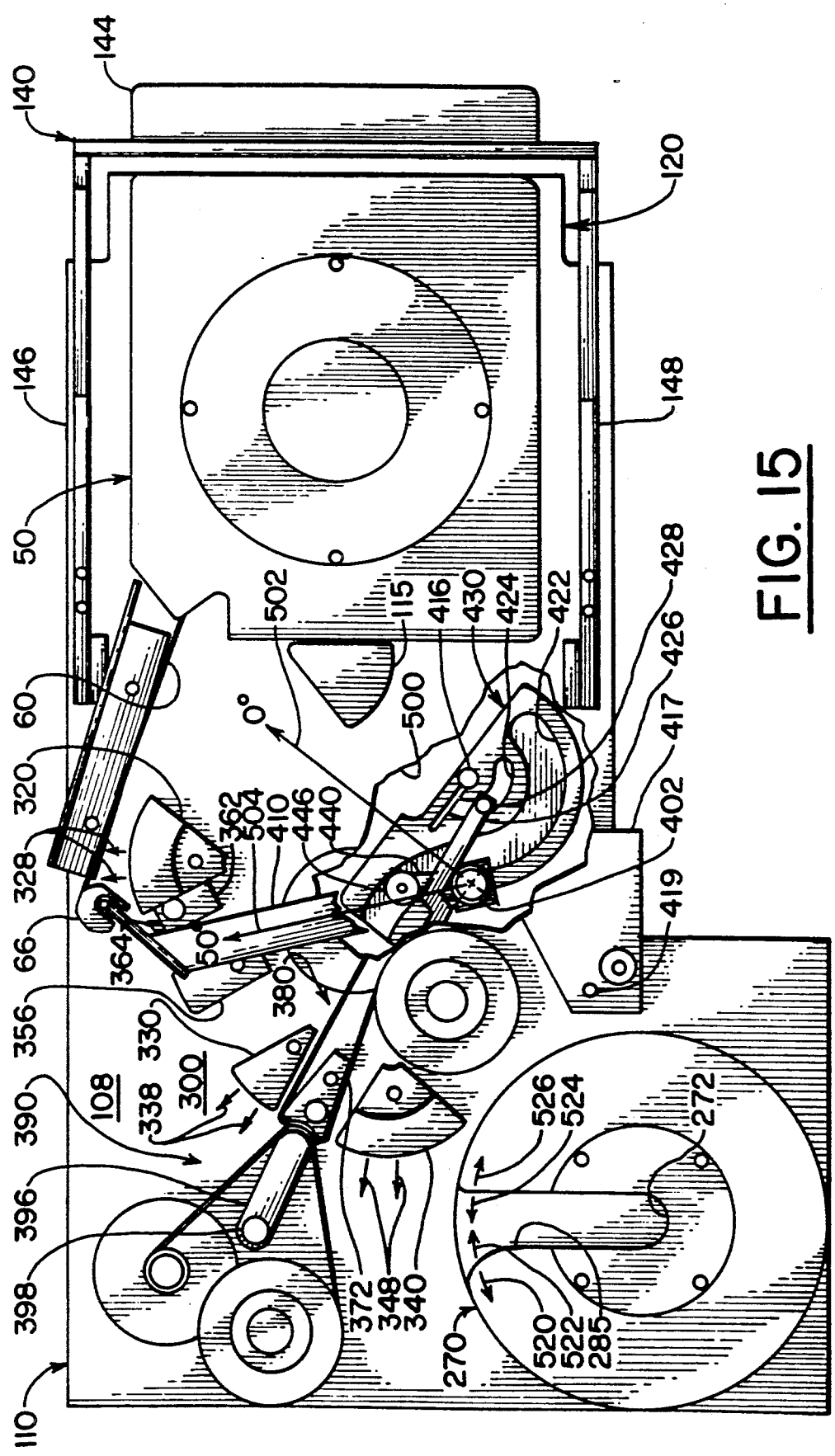
FIG. 15 is another top plan view of the tape path chassis similar to FIG. 14, with a portion cut away to reveal the threader cam on the bottom side of the tape path chassis and to show the relationship between the threader arm on top with the threader cam on the bottom when the threader arm is approximately 50° through its rotation.

As threader motor 420 turns, it begins a counterclockwise rotation (as viewed from above as in FIGS. 14 through 18, clockwise as viewed from below in FIG. 13) of cam 430. This initial rotation of cam 430 can be seen in FIG. 15. As cam 430 rotates, it causes guide wheel 446 to progress along guide slot 422, resulting in rotation of guide arm 440 about axle 402, and therefore rotation of threader arm 410. To exemplify this principle, a rotation of about 50° is shown in FIG. 15. At this point, engagement rod 408 has withdrawn puck 66, and accordingly tape 60, from cartridge 50. Also, at this 50° stage depicted in FIG. 15, guide peg 428 has begun its path along guide slot 424, which is a similar but a more restricted path than that taken by guide wheel 446 along slot 422. Despite the progression of peg 428 along guide slot 424, displacement arm 426 has not moved due to the effect of spring 438.

Figure 16:
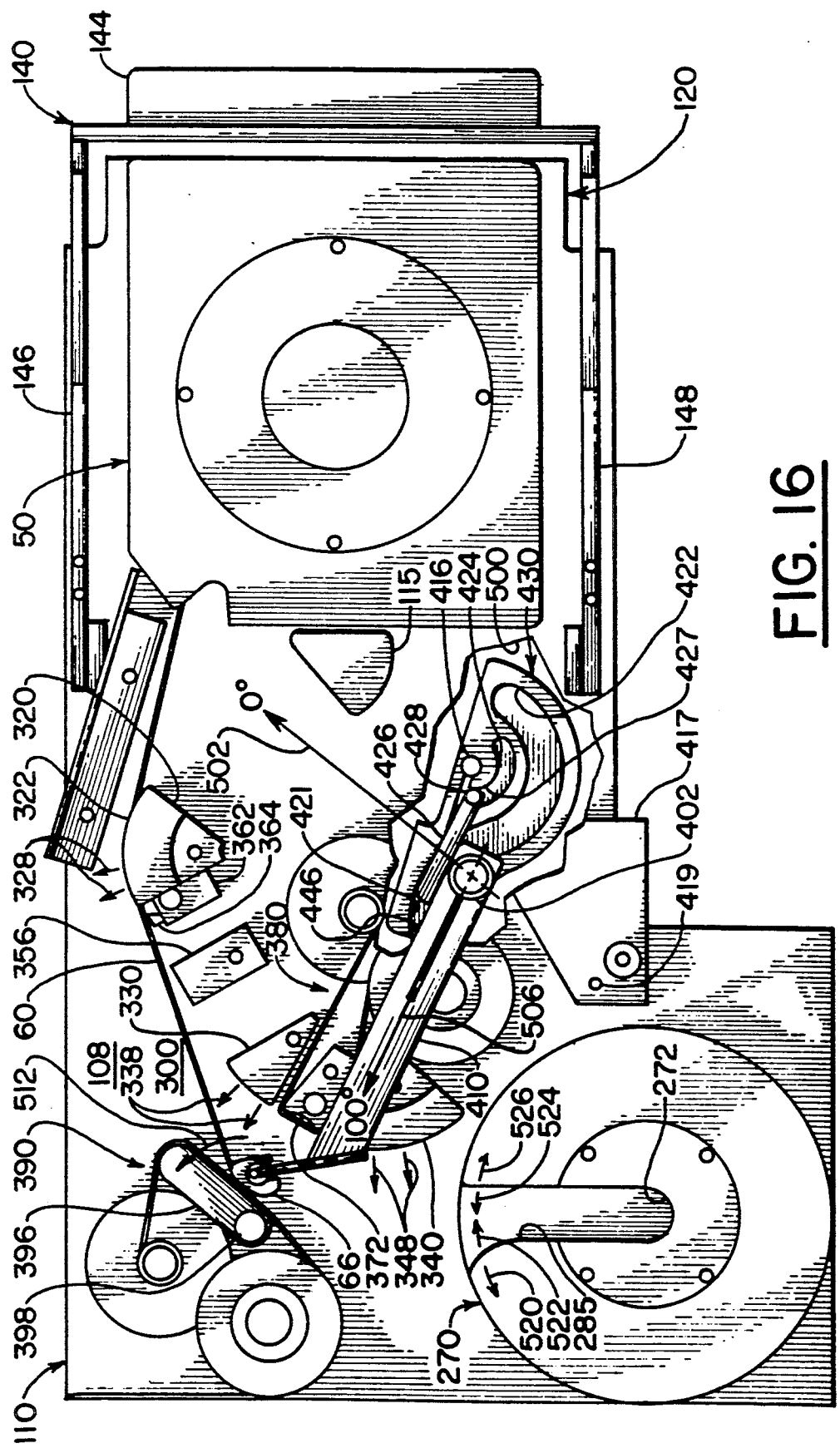
FIG. 16 is still another top plan view of the tape path chassis similar to FIGS. 14 and 15 with a portion cut away to reveal the threader cam on the bottom side of the tape path chassis and to show the relationship between the threader arm on top with the threader cam on the bottom when the threader arm is approximately 100° through its rotation.

In FIG. 16, cam 430 is shown rotated even further, having thus caused a rotation of threader arm 410 through an arc of approximately 100°. At this point in the threading operation, rotable extension arm 396 has rotated in the direction of arrow 512 about its axle 398 to allow passage thereby of threader arm 410 and puck 66. This rotation of extension arm 396 in direction 512, is accomplished by guide peg 428 having engaged the guide slot edge 427. Then, because displacement arm 426 is of sufficient length to prevent rotation of cam 430 without displacement of displacement arm 426, once peg 428 engages edge 427, for a few critical degrees, proximal end 429 of displacement arm 426 is pushed in the direction of arrows 514 and 516 (as seen in FIG. 13). This, in turn, causes the closing up of scissor connection 433 and its extension in the direction of arrow 514, causing rotation of the extension flexing arm 434 in the direction of arrow 512 and in turn rotation of extension arm 396 also in the direction of arrow 512.

It should be noted in FIG. 16 that tape 60 has been placed adjacent surface 322 of air bearing 320. Tape 60 is placed adjacent, but never in contact with, surface 322 of air bearing 320 or surfaces 332 and 342 of air bearings 330 and 340, due to the operation of positive air pressure pump 80, exhausting lightly pressured air 328, 338 and 348.

Figure 17:
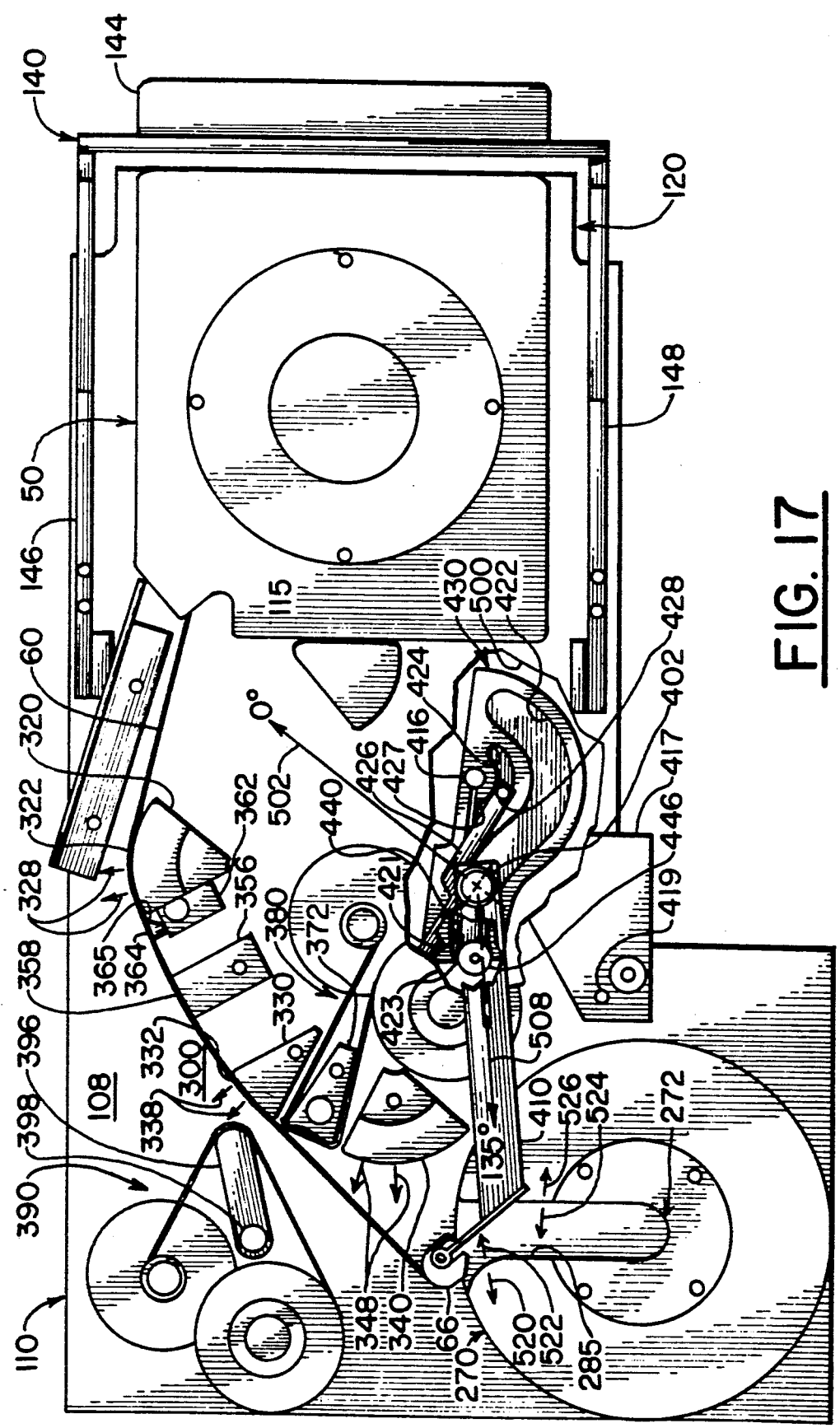
FIG. 17 is still another top plan view of the tape path chassis similar to FIGS. 14, 15, and 16 with a portion cut away to reveal the threader cam on the bottom side of the tape path chassis and to show the relationship between the threader arm on top with the threader cam on the bottom when the threader arm is approximately 135° through its rotation; and, FIG. 18 is yet another top plan view of the tape path chassis similar to FIGS. 14, 15, 16, and 17 with a portion cut away to reveal the threader cam on the bottom side of the tape path chassis and to show the relationship between the threader arm on top with the threader cam on the bottom when the threader arm is approximately 165° through its rotation.

By FIG. 17, cam 430 has rotated further and threader arm 410 has been caused to rotate to approximately 135° as shown by reference arrow 508. Further, tape 60 has been placed so that it is now adjacent additional surface 358 of path guide block 356, and face 332 of air bearing 330. Still further, cam 430 is beginning to pass beyond that critical range of its rotation, whereby its rotation is dependent upon the displacement of arm 426. Accordingly, displacement arm 426 is beginning to return to its normal position, despite guide peg 428 remaining in contact with guide slot edge 427.

As shown in FIG. 17, guide wheel 446 reaches, or very nearly reaches extreme end 423 of guide slot 422, such that any further progress of guide wheel 446 within such slot 422 would deliver wheel 446 beyond guide slot 422 and off cam 430. However, because threader guide arm 440 is then aligned essentially parallel with flattened portion 421 of guide slot 422, further rotation of cam 430 will cause a withdrawal of guide wheel 446 from extreme end 423 of guide slot 422, albeit continuing the rotation of threader arm 410 by axle 402, and not a removal of guide wheel 446 from slot 422 and therefore cam 430.

The shaking of take-up wheel 270, indicated by arrows 520, 522, 524, 526 permits puck 66 to located opening 286 in take-up wheel top 276 and subsequently get past corner 285.

Figure 18:
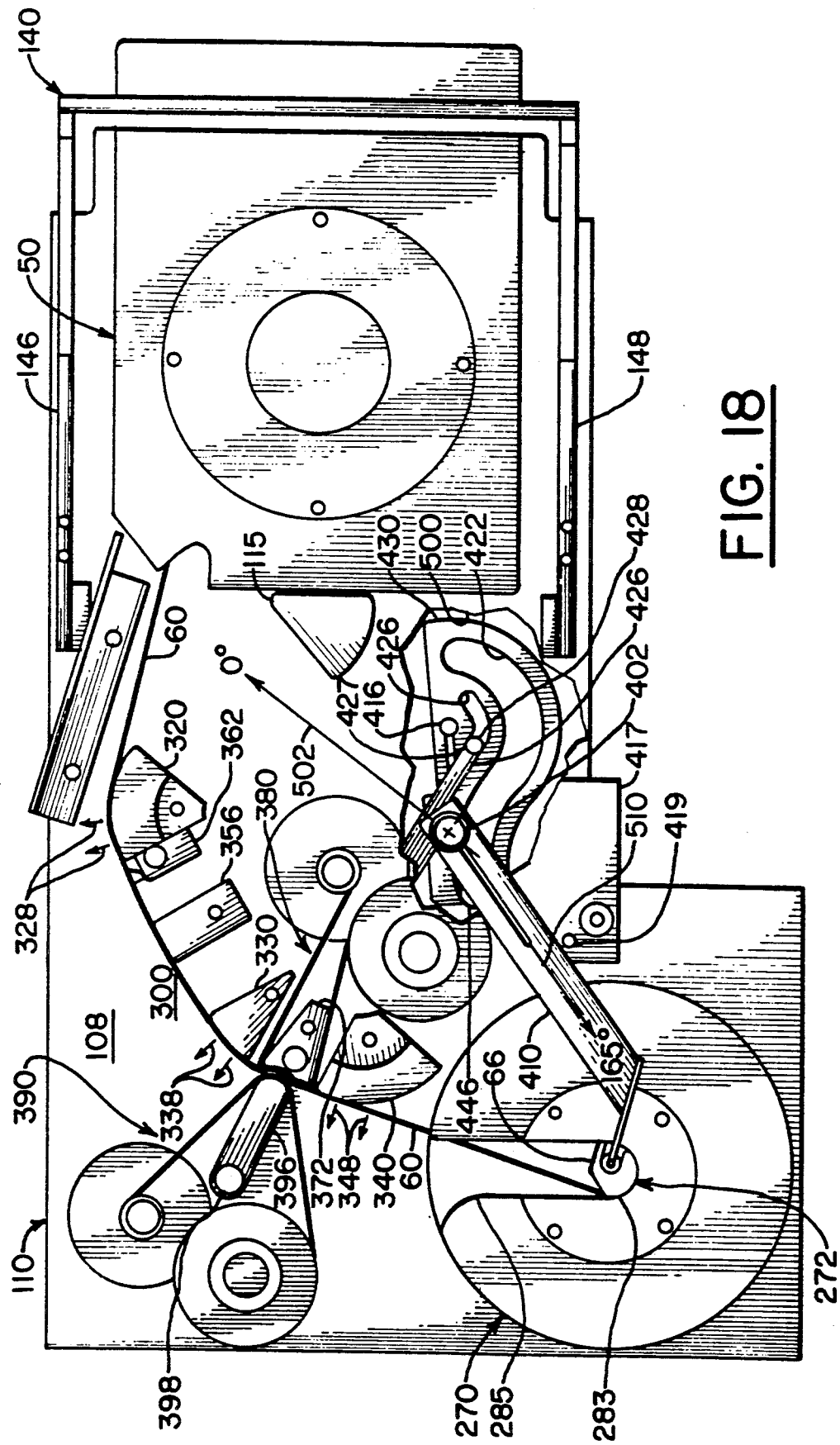

With reference to FIG. 18, threader arm 410 delivers puck 66 to convex edge 284 with a force of approximately 8 ounces to properly set puck 66 at the drum 272 of take-up wheel 270. This places threader arm 410 at approximately 165° from the reference position 0°. Concurrent with the delivery of puck 66 to drum 272, threader arm 410 has been placed adjacent stop bar 419. Puck 66 then forms a portion of the central drum 272, about which tape 60 will be wrapped. Delivery of puck 66 to the center of take up wheel 270 signals the end of the tape threading operation and accordingly the cessation of the rotation of cam 430.

Also shown in FIG. 18, guide peg 428 has been allowed to withdraw from guide slot edge 427 and to continue back along guide slot 424. Accordingly, displacement arm 426 has returned to its normal position due to the tension from spring 438 and accordingly fabric extension arm 396 has returned to its normal position, now in contact with the outside surface 64 of tape 60.

After completion of the tape threading operation the tape cleaning operation begins with wheel 270 making three (3) slow but deliberate counterclockwise rotations. These three slow rotations ensure proper take-up and wrapping of tape 60 about drum 272. Take-up wheel 270 then accelerates rapidly until the desired linear velocity of tape 60 over pressure transducer 352 is achieved. Once achieved, this desired linear velocity is maintained by continuous controlled fluctuations or variations in the current I supplied to both take-up drive system 250 and supply drive system 210, as described above.

As tape 60 is progressing along tape path 300, inside fabric wiping apparatus 380 and outside fabric wiping apparatus 390 begins to slowly and continuously move a supply of cleaning fabric past fabric wiping station 270 and in cleaning contact with tape 60, as assisted by vacuum access port 382. Similarly, vacuum access port 368 assists the cleaning done by ceramic knife 364.

The tape cleaning operation can be terminated manually by pressing the abort button 26 on front panel 14, (seen in FIG. 4) or automatically when all but a few meters of tape 60 has been received by take-up wheel 270. The point of automatic stopping is calculated by microprocessor 90, based upon the calculated radius of supply drum 58 within cartridge 50 in conjunction with tachometer 268. When all but a few meters, which may for example be four (4) meters, has been received by take-up wheel 270, take-up wheel 270 is slowed to a stop, thereby terminating the forward tape cleaning operation.

Upon the termination of the forward cleaning operation the roles of supply drive system 210 and take-up drive system 250 reverse, and tape 60 is returned to tape cartridge 50. Once all of tape 60 has been returned to cartridge 50, except the few centimeters displaced along tape path 300, cam 340 begins rotation. Cam 340 now rotates in a clockwise direction (as seen from above in FIGS. 14 through 18) and the threading operation is reversed. When completely unthreaded, puck 66 will have been returned to opening 56 as seen in FIG. 14. Upon achieving this return to the home position, cam 340 continues its rotation in this clockwise direction (as seen from FIG. 14, counter-clockwise as seen in FIG. 13) until cam 340 pulls on release arm 451, elongating it sufficiently to cause release member 176 to pull on release rod 174. This pull on release rod 174 rotates latches 158, 160 away from lock pins 155, 156, freeing door 140 to return to its spring biased up and open position. However, spring 154 is not strong enough to break the magnet hold, which magnetic 228 holds over annular drum 58. Accordingly, despite its new found freedom, door 140 cannot raise and cartridge carriage 119 cannot raise until the magnetic hold can be broken. Breaking the magnetic hold is accomplished, as seen in FIG. 6, by rotation of beveled cam 115, allowing it to get under and raise up the front bottom taper 55b of cartridge 50.

As discussed above, beveled cam 115 not only breaks the magnetic hold, but also begins to push cartridge 50 slightly forward, delivering bumper 136 to slanted surface 57 on cartridge 50. Once the magnetic hold is broken, door 140 opens concurrent with the rising of carriage 119. Swing arm 132, as motivated by spring 30 and controlled by Airpot 126, begins to push on cartridge 50. This motivating force continues until cartridge 50 is out of doorway 40, allowing retrieval of said cartridge 50 by the user. After ejection of the cartridge, software within microprocessor 90 returns threader cam 430 to its home position.

Referring back now to FIG. 8 to describe drive systems 210, 250 in greater detail, lowering carriage 119 brings cartridge 50 into contact and engagement with a tape supply drive 210. The supply drive 210 is located within hole 200 of tape path board 110. Other features of tape path board 110 associated with supply drive 210 include circular indentation 202, concentric to hole 200. A cylindrical wall 204 extends vertically down from indentation 202, around hole 200.

Turning to the drive itself, tape supply drive 210 may, for example, be a pulse width modulation (PWM) brushless D.C. reel motor. Drive 210 includes a set of bearings 218 which encase a rotor 214 and are secured within hole 200. An axle 212 is connected to rotor 214 and rotatably extended through bearing sets 218 and, contains a hub 216. Commutator cup 220 is attached to axle 212, just below bearings set 218 and extends out and then up and around cylindrical wall 204. A plurality of magnetic field generators, represented by 222 and 224 in FIG. 8, lie just outside the commutator 220, and within a supply drive housing 226. Magnetic field generators 222, and 224 also fit up within annular indentation 208 along the bottom of tape path board 110 and concentric to hole 200. Varying the magnetic fields within generators 222, 224, impels commutator 220, and thus axle 212 in a circular manner. Variation of the magnetic fields within generators 222, 224, thus, variation of the angular velocity of tape supply drive system 210, is software controlled by microprocessor 90 according to system demands, as discussed above.

Annular magnet 228, within cupped shield 230, is secured to hub 216. Shield 230 is adjacent and conforms to circular indentation 202. Shield 230 also conforms to circular rise 59 on the bottom of tape cartridge 50 (with singular reference to FIGS. 2 and 3). Accordingly, when carriage 119 is lowered, annular disk 58, within cartridge 50, is brought into the proximity of annular magnet 228, and engaged thereby.

Still with primary reference to FIG. 8, tape take-up drive system 250 is located at the other end of tape path board 110. Tape take-up drive system 250, similar to tape supply drive system 210, may be a pulse width modulation (PWM) brushless D.C. reel motor. Tape drive system 250 is placed in association with a hole 240 defined by a cylindrical wall 244. Other features of tape path board 110 designed to accommodate drive 250 include a circular indentation 242, concentric to hole 240. Fitted snugly within hole 240 are a set of bearings 258. An axle 252 runs the length of tape drive system 250, with a rotator 254 located in the center of bearings 258. A rotatable commutator cup 260 is secured to axle 252 and extends out from axle 252, and up and around cylindrical wall 244. A plurality of magnetic field generators represented in FIG. 8 by generators 262 and 264 are adjacent to commutator 260 and along annular indentation 248. Similar to tape supply drive system 210, the variation of the magnetic fields within generators 262, 264 of tape take-up drive system 250, and thus the angular velocity of drive system 250 is software controlled by microprocessor 90. The final similarity between the two tape drive systems is a tape supply drive housing 266 which encloses supply drive system 250.

There are also a few differences between take-up drive system 250 and supply drive system 210. First, take-up drive system 250 includes a two phase, single index tachometer 268 connected to axle 252 and located below housing 266. Tachometer 268 is also connected to microprocessor 90, such that the direction and number of rotations of take-up drive system 250 can be recorded.

There are several additional differences between drive systems 210 and 250. For example, take-up drive system hub 256 is shorter than supply drive system hub 216 and continued so that take-up wheel 270 can be fitted about hub 256 by its wheel base 274. Wheel base 274 is attached to hub 256 such that take-up wheel 270 rotates along with axle 252. Take-up wheel 270 includes a central drum 272 concentric with hub 256 and base 274. Take-up wheel 270 also includes a top 276. Central drum 272 includes a drum side wall 278, the height of which corresponds to, but is slightly higher than, the width of tape 60. Side wall 278, while not extending entirely around axle 252, is concentric to axle 252. Interruption 279 in side wall 278 corresponds to slot 280 in top 276. Slot 280 extends from exterior edge 277 of top 276 with two parallel edges 281, 282, joined by arced edge 283, also concentric to axle 252. As parallel edge 282 approaches exterior edge 277, it flares out at corner 285 to convex edge 284, which expands away from edge 281. Convex edge 284, makes a necessary wider target for delivery of tape 60, as discussed above. Slot 280 and interruption 279 in sidewall 278, allow puck 66 to be placed in the center of take-up wheel 270, ensuring effective engagement and wrapping of tape 60 by wheel 270.

Referring back now to FIG. 5, to further describe the components contained within cabinet 11, spacer arms 70, 72 are connected between support arms 17, 18. Dual air filters 74 and 76 (shown in phantom lines) are located on top of spacer arms 70 and 72. Air filter 74 filters air supplied to vacuum pump 78. Filter 74 may be, for example, a 3×0.5 micron filter and is used to protect pump 78 and to collect contamination and debris removed from the magnetic tape in the cleaning operation for possible analysis. Air filter 76 filters air delivered from positive air pump 80. Filter 76 may also be a 3×0.5 micron filter. This pressure side filter 76 is used to both filter the air supplied to air bearings 320, 330, 340 and to act as a heat sink, cooling the supply of air to prevent heat damage to magnetic tape 60.

Vacuum pump 78 is fitted with a muffler 82 and a long length of flexible vacuum hose 84 connected to vacuum access ports 498, 499 located under tape path chassis 110 (with singular reference to FIG. 13). It is preferred that vacuum hose 84 be as long as practical for the space available and that it be routed through several curves or coils to absorb and dampen the vibration of vacuum pump 78 in the hose 84, rather than to transmit those vibrations to tape path chassis board 110.

Similar to vacuum pump 78, positive pressure pump 80 has a muffler 86 and a long length of flexible air hose 88 to connect and feed pressurized air from pump 80 to the air bearings 320, 330, and 340. Again, flexible air hose 88 is longer than needed simply to reach from pump 80 to air pressure supply port 496 under tape path board chassis 110 (with singular reference to FIG. 13). This extra length absorbs and dampens vibration from air pump 80 so that it is not delivered to tape path board chassis 110.

It is possible to use a single air pump in place of the two air pumps 78 and 80. Most conventional small air pumps have more than sufficient capacity to handle both jobs. However, even when using a single air pump, it is still preferable to use two air filters 74, 76. The vacuum side filter 74 removes contamination and debris collected during the tape cleaning operation. The pressure side filter 76 acts as a heat sink to cool the air delivered to air bearings 320, 330, 340 to prevent damage to tape 60.

Another advantage in using a single air pump is that vacuum side hose 82 and positive pressure side hose 88 can be made longer due to the increased available space inside cabinet 11. As discussed above, the advantage of having long lengths of hoses 82, 88 is that the additional length reduces, or virtually eliminates, transmission of vibration from the pump to the tape path board 110.

Cabinet 11 also contains the microprocessor controller 90, which, as described above, controls all the coordination and communication between the various components of the present invention. Microprocessor 90 includes several 24 volt computer PC boards.

Cabinet 11 additionally contains a power supply 100, which may be conveniently connected to a standard 110 volt wall outlet via power cord 102. Incoming power is further routed through a relay 104 to an AC power distributor 106.

Returning now to FIG. 4, operating controls 20, indicator lights 30, and status lights 38, are located on front panel 14. Operating controls 20 may include, for example, a ready light 22, which lights when the present invention is ready to clean, re-tension, or scan a magnetic tape from a tape cartridge. Start button 24, located directly below ready light 22 and enabled by same, is used to begin tape withdrawal from cartridge 50 for cleaning, re-tensioning, or scanning. The other control buttons may include an abort button 26 and reset button 28, which allow any operation to be stopped in progress, returning tape 60 to cartridge 50 and ejecting cartridge 50 from cabinet 11.

Indicator lights 30 include several lights such as, for example, a tape moving light 32 and a cycle complete light 33. The function of indicator lights 32 and 33 are self-explanatory. Indicator lights 30 may also include a scan pass light 34 and a scan fail light 35. Pass/fail lights 34 and 35 may indicate the results of an optical evaluation of the tape to detect physical imperfections of the tape or may indicate the results of a magnetic evaluation of the tape to detect data loss, commonly referred to as "drop outs". Indicator lights 30 may include several sets of scan pass/fail lights 34, 35, in situations where several methods of tape scanning are employed. The actual number and related meaning of a set of pass/fail lights 34, 35 will depend upon the specific end use to which a given embodiment is to be put.

Additionally, indicator lights 30 may include a replace cleaning elements indicator light 36, which, alerts an operator to the necessity of some routine maintenance. As described above, the frequency with which routine maintenance is required is greatly reduced by the present invention. Similarly, the ease with which the maintenance can be performed is greatly improved by the present invention.

Status lights 38 may include a series of numbered lights, which in this example total eight (8) lights, numbered from zero (0) to seven (7). Status lights 38 light in various patterns, the interruption of which is quite vast, ranging from air pump failure to the inability of the device to engage the tape puck 66. Specific interruption of a given sequence of lighted numbered lights 38, as well as a listing of the broad range of possible coded messages is given in the instruction manual to a specific embodiment.

In addition to those features described above, the present invention may also be fitted with an optional stager (not shown) which up to 12 tape cartridges. Such a stager can automatically load these tape cartridges for cleaning, as well as automatically start the threading operation and subsequent cleaning.

Accordingly, a product and process for the cleaning, scanning, evaluating, and reading and recording of magnetic tapes has been provided which demonstrates greater efficiency in operation and economy of motion.

The precisely engineered cam 430 and its interrelated members makes possible the shorter mean tape path which means 1) higher tape resonance and accordingly greater linear velocity, 2) greater control over tape velocity and tape tension, 3) reduced need for maintenance, as well as 4) greater ease and speed in those maintenance operations.

The foregoing is considered as illustrative only of the principles of the invention. Further, since numerous modifications and changes will readily occur to those skilled in the art, it is not desired to limit the invention to the exact construction and operation shown and described herein, and accordingly, all suitable modifications and equivalents may be resorted to falling within the scope of the invention as defined by the claims which follow.

The embodiments of the invention in which an exclusive property or privilege is claimed are defined as follows:

1. Tape cleaning apparatus for removing particles from a first surface of an elongated strip of magnetic tape that has said first surface and a second surface on opposite sides of the strip, comprising:
    first wiping means positioned for contacting relation with said first surface of said magnetic tape for wiping particles off said first surface of said tape, said wiping means including a first wiping medium that is permeable to air positioned for contacting said first surface of said tape, and first vacuum means positioned adjacent said first wiping medium such that said first wiping medium is positioned between said tape and said first vacuum means when said first wiping medium is in contact with said first surface of said tape for creating a low pressure area in said first wiping medium adjacent said tape to assist in positively seating and holding said first surface of said tape in biased contact with said first wiping medium and for drawing air and particles from said first surface of said tape into said first wiping medium and retaining them there; and
    drive means adapted for connection to said magnetic tape for moving said magnetic tape in relating to said first wiping means.

2. The tape cleaning apparatus of claim 1, wherein said first wiping medium is a fabric.

3. The tape cleaning apparatus of claim 1, wherein said first wiping means includes a first wiping guide block positioned adjacent said first wiping medium such that said first wiping medium is between said tape and said first wiping guide block, said first wiping guide block having a first guide surface adjacent said first wiping medium, and said first vacuum means including a port in said first guide surface of said first wiping guide block connected to a vacuum source.

4. The tape cleaning apparatus of claim 1, wherein said first wiping medium is an elongated ribbon, and wherein said first wiping means includes a supply spool with a portion of said elongated ribbon of first wiping medium wound thereon and adapted for being unwound therefrom, a take-up spool adapted for taking up portions of said first wiping medium that are unwound from said supply spool, and first wiping medium drive means for moving portions of said first wiping medium from said supply spool, past said first guide surface and past said first surface of said tape and to said take-up spool.

5. The tape cleaning apparatus of claim 1, including a sharp scraper blade positioned for contact with said first surface of said tape and second vacuum means positioned adjacent said scraper blade for carrying away particles scraped from said first surface of said tape by said scraper blade.

6. The tape cleaning apparatus of claim 5, wherein said scraper blade is positioned in relation to said first wiping means such that portions of said first surface of said tape are contacted by said scraper blade prior to being contacted by said first wiping means when said drive means moves said tape.

7. The tape cleaning apparatus of claim 3, including second wiping means positioned for contacting relation with said second surface of said tape for wiping particles off said second surface of said tape.

8. The tape cleaning apparatus of claim 7, wherein said second wiping means includes a second wiping medium adapted for contacting said second surface of said tape.

9. The tape cleaning apparatus of claim 8, wherein said second wiping means includes a second guide block positioned adjacent said second wiping medium for holding said second wiping medium in contact with said second surface of said tape.

10. The tape cleaning apparatus of claim 9, including threading means adapted for engaging a leading end of said tape and moving it past said first wiping means and said second wiping means, said second guide block being moveable toward and away from said tape, and block moving means for moving said second guide block and said second wiping medium away from said tape as said threading means is moving said leading edge of said tape past said second wiping means.

11. The tape cleaning apparatus of claim 9, wherein said second guide block has a second guide surface adjacent said second wiping medium and wherein said second wiping means is positioned adjacent said first wiping means such that said first guide surface and said second guide surface are in juxtaposed relation to each other on opposite sides of said tape with said first wiping medium being between said first surface of said tape and said first guide surface, said second wiping medium being between said second surface of said tape and said second guide surface, and said tape being between said first wiping medium and said second wiping medium.

12. The tape cleaning apparatus of claim 11, wherein said first guide surface is concave and said second guide surface is convex.

13. Tape cleaning apparatus for removing particles from a first surface of an elongated strip of magnetic tape that has said first surface and a second surface on opposite sides of the strip, comprising:
    sharp-edged scraper means positioned for contact with said first surface of said tape for scraping particles off said first surface of said tape; and
    vacuum means positioned adjacent said scraper means for assisting in holding said tape in biased contact with said scraper means and for removing and carrying away particles scraped off said first surface of said tape by said scraper means.

14. The tape cleaning apparatus of claim 13, including a first wiping medium that is permeable to air positioned for contact with said first surface of said tape after said first surface of said tape is scraped by said scraping means, and further vacuum means positioned adjacent said first wiping medium such that said first wiping medium is positioned between said tape and said further vacuum means, for pulling said tape toward said first wiping medium and for pulling particles away from said first surface of said tape and into said first wiping medium.

15. In a tape cleaning apparatus for cleaning magnetic tape from a tape cartridge, wherein the magnetic tape has an inside surface and an outside surface, at least one of which surfaces is adapted to contain data, and wherein the tape cleaning apparatus includes a take-up spool for winding the magnetic tape from the cartridge along a tape path, and a tape loading apparatus for loading the magnetic tape from the cartridge onto the take-up spool, an improvement comprising:
　air bearing means positioned adjacent the tape path for supporting the magnetic tape as it travels along the tape path; and
　vacuum assisted cleaning means positioned adjacent said tape path for cleaning the magnetic tape, said vacuum assisted cleaning means including a first cleaning tape guide block assembly with a first wiping medium positioned adjacent the tape path on the inside surface of the magnetic tape and a second cleaning tape guide block assembly with a second wiping medium positioned adjacent the tape path on the outside surface of the magnetic tape, said first cleaning tape guide block assembly containing a vacuum port for assisting in holding said magnetic tape in contact with said first wiping medium and for pulling particles from said inside surface of said magnetic tape into said first wiping medium and retaining them there, and said first and second cleaning tape guide block assemblies being adapted to hold said first and second wiping media in contact with the respective inside surface and outside surface of the magnetic tape.

16. The tape cleaning apparatus of claim 15, wherein said vacuum assisted cleaning means includes vacuum assisted scraper means positioned adjacent said tape path for scraping the surface of the tape that is adapted to contain data.

17. The tape cleaning apparatus of claim 16, wherein said air bearing means are positioned adjacent the surface of the tape that is adapted to contain data.

18. The tape cleaning apparatus of claim 17, wherein said first and second cleaning tape guide block assemblies are positioned in opposed relation on opposite sides of the tape path and wherein said first cleaning tape guide block assembly includes a concave cleaning zone and said second cleaning tape guide block assembly includes a convex cleaning zone, such that said first and second cleaning tape guide block assemblies nest together with the convex cleaning zone of said second cleaning tape guide block assembly nesting in the concave cleaning zone of said first cleaning tape guide block assembly, so that the respective first and second wiping media contact the respective inside surface and outside surface of the magnetic tape at opposing positions.

19. The tape cleaning apparatus of claim 18, including pressure transducer means positioned adjacent said tape path for monitoring tension of said magnetic tape.

20. The tape cleaning apparatus of claim 19, wherein said vacuum assisted scraper means comprises:
　a cleaning blade having a knife edge; and
　a vacuum port adjacent said knife edge.

21. Apparatus for cleaning magnetic tape from a tape cartridge, the magnetic tape having a beginning and an end and being wound around an annular drum inside of the cartridge such that the magnetic tape beginning is unwound before the magnetic tape end, wherein the magnetic tape has an inside surface and an outside surface, at least one of which surfaces is adapted to contain data, and wherein the tape cartridge also includes a puck attached to the beginning of the magnetic tape, comprising:
　cartridge receiving means adapted for receiving and retaining the tape cartridge, said cartridge receiving means including means for engaging the annular drum in the cartridge;
　tape take-up means for unwinding the magnetic tape from the cartridge, said take-up means including a take-up wheel adapted to receive the puck;
　tape threading means for threading the puck from the cartridge onto said take-up wheel, said tape threading means including a threader arm adapted to releasably engage the puck, said threader arm being pivotable between first and second positions, the first position allowing said threader arm to engage the puck at the cartridge and the second position allowing said threader arm to engage the puck at said take-up wheel, the magnetic tape following a tape path between the first and second positions;
　vacuum assisted tape cleaning means positioned adjacent said tape path for cleaning the magnetic tape, said vacuum assisted tape cleaning means including a first cleaning tape guide block assembly with a first wiping medium positioned adjacent the tape path on the inside surface of the magnetic tape and a second cleaning tape guide block assembly with a second wiping medium positioned adjacent the tape path on the outside surface of the magnetic tape, said first cleaning tape guide block assembly containing a vacuum port for assisting in holding said magnetic tape in contact with said first wiping medium and for pulling particles from said inside surface of said magnetic tape into said first wiping medium and retaining them there, and said first and second cleaning tape guide block assemblies being adapted to hold said first and second wiping media in contact with the respective inside surface and outside surface of the magnetic tape; and
　control means connected to said cartridge receiving means, said tape take-up means, said tape threading means, and said vacuum assisted tape cleaning means for automatically controlling the threading and cleaning of the magnetic tape.

22. The apparatus for cleaning magnetic tape of claim 21, further comprising air bearing means positioned adjacent the tape path for supporting the magnetic tape as it travels along the tape path.

23. The apparatus for cleaning magnetic tape of claim 22, wherein said vacuum assisted cleaning means includes vacuum assisted scraper means positioned adjacent said tape path for scraping the surface of the tape that is adapted to contain data.

24. The apparatus for cleaning magnetic tape of claim 23, wherein said air bearing means are positioned adjacent the surface of the tape that is adapted to contain data.

25. The apparatus for cleaning magnetic tape of claim 24, wherein said first and second cleaning tape guide block assemblies are positioned in opposed relation on opposite sides of the tape path and wherein said first cleaning tape guide block assembly includes a concave cleaning zone and said second cleaning tape guide block assembly includes a convex cleaning zone, such that said first and second cleaning tape guide block assemblies nest together with the convex cleaning zone of said second cleaning tape guide block assembly nesting in the concave cleaning zone of said first cleaning tape guide block assembly, so that the respective first and second wiping media contact the inside surface and outside surface of the magnetic tape at opposing positions.

26. The apparatus for cleaning magnetic tape of claim 25, including pressure transducer means positioned adjacent said tape path for monitoring tension of said magnetic tape.

27. The apparatus for cleaning magnetic tape of claim 26, wherein said vacuum assisted scraper means comprises:
a cleaning blade having a knife edge; and
a vacuum port adjacent said knife edge.

28. The apparatus for cleaning magnetic tape of claim 27, wherein said threader arm is connected to a threader cam, with a guide slot, by way of a guide arm, said threader cam being driven by a threader drive motor.

29. The apparatus for cleaning magnetic tape of claim 28, wherein said threader cam has a home position when said threader arm is in said first position, from which rotation in one direction causes movement of said threader arm to said second position thereby threading the tape along the tape path, the threader cam reaching its maximum point of rotation when said threader arm is in said second position.

30. The apparatus for cleaning magnetic tape of claim 28, wherein said tape take-up wheel is connected to a tachometer for measuring longitudinal displacement of the magnetic tape.

* * * * *